(12) United States Patent
Watanabe et al.

(10) Patent No.: US 11,661,084 B2
(45) Date of Patent: May 30, 2023

(54) INFORMATION PROCESSING APPARATUS, INFORMATION PROCESSING METHOD, AND MOBILE OBJECT

(71) Applicant: SONY CORPORATION, Tokyo (JP)

(72) Inventors: Ryo Watanabe, Tokyo (JP); Masataka Toyoura, Tokyo (JP); Takamori Yamaguchi, Tokyo (JP); Ryo Takahashi, Tokyo (JP); Keisuke Maeda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 234 days.

(21) Appl. No.: 16/763,223

(22) PCT Filed: Oct. 30, 2018

(86) PCT No.: PCT/JP2018/040213
§ 371 (c)(1),
(2) Date: May 11, 2020

(87) PCT Pub. No.: WO2019/098002
PCT Pub. Date: May 23, 2019

(65) Prior Publication Data
US 2020/0331499 A1 Oct. 22, 2020

(30) Foreign Application Priority Data
Nov. 20, 2017 (JP) .............................. JP2017-222961

(51) Int. Cl.
*B60W 60/00* (2020.01)
*G01C 21/34* (2006.01)
*G01S 19/42* (2010.01)

(52) U.S. Cl.
CPC ..... *B60W 60/0025* (2020.02); *G01C 21/3407* (2013.01); *G01C 21/3453* (2013.01); *G01S 19/42* (2013.01)

(58) Field of Classification Search
CPC ............ B60W 60/0025; B60W 40/04; B60W 60/0011; B60W 2050/065;
(Continued)

(56) References Cited

U.S. PATENT DOCUMENTS

2017/0299397 A1 10/2017 Ichikawa et al.
2017/0363430 A1* 12/2017 Al-Dahle ............. G05D 1/0221
(Continued)

FOREIGN PATENT DOCUMENTS

CN 107305126 A 10/2017
EP 3293487 A1 3/2018
(Continued)

OTHER PUBLICATIONS

International Search Report and Written Opinion of PCT Application No. PCT/JP2018/040213, dated Jan. 29, 2019, 06 pages of ISRWO.

*Primary Examiner* — Rodney A Butler
(74) *Attorney, Agent, or Firm* — Chip Law Group

(57) ABSTRACT

An information processing apparatus according to an aspect of the present technology includes an estimation unit, a generation unit, and a frequency control unit. The estimation unit estimates at least one of a location or a posture of a mobile object. The generation unit generates a movement plan for moving the mobile object. The frequency control unit controls frequency of update of the movement plan to be performed by the generation unit, on the basis of load index information serving as an index of a load on the estimation unit.

20 Claims, 11 Drawing Sheets

(58) Field of Classification Search
CPC .......... B60W 2420/42; B60W 2556/50; G01C 21/3407; G01C 21/3453; G01C 21/1656; G01C 21/32; G01S 19/42; G05D 2201/0213; G05D 1/0248; G05D 1/027; G05D 1/0274; G08G 1/0962
USPC ........................................................ 701/26
See application file for complete search history.

(56) References Cited

U.S. PATENT DOCUMENTS

2018/0024562 A1* 1/2018 Bellaiche ............ G06V 20/588
 701/26
2019/0293435 A1* 9/2019 Mori .................... G01S 13/867
2019/0384299 A1* 12/2019 Maruyama ........... G05D 1/0088

FOREIGN PATENT DOCUMENTS

| JP | 06-259131 A | | 9/1994 |
| JP | 2003-178396 A | | 6/2003 |
| JP | 2012103819 A | * | 5/2012 |
| JP | 2014-202561 A | | 10/2014 |
| JP | 2017-194527 A | | 10/2017 |
| KR | 10-2017-0119632 A | | 10/2017 |

* cited by examiner

|  | Internal sensor | External sensor |
|---|---|---|
| Recognizer | Acceleration sensor, Gyro sensor, IMU, Wheel encoder, Visual SLAM, etc. | Stereo camera, Monocular camera, ToF sensor, LiDAR sensor, Place recognition, etc. |
| Physical quantity | Speed, Acceleration, Relative location, Angular velocity | Location, Posture |
| Absolute location Absolute posture | Unavailable | Available |
| Detection rate | High | Low |

FIG.4

| | Keyframe ID | Acquisition location/posture | Keyframe |
|---|---|---|---|
| 60(60a) | 1 | (x1, y1, θ1) | Keyframe 1 |
| 60b | 2 | (x2, y2, θ2) | Keyframe 2 |
| 60c | 3 | (x3, y3, θ3) | Keyframe 3 |
| 60d | 4 | (x4, y4, θ4) | Keyframe 4 |
| 60e | 5 | (x5, y5, θ5) | Keyframe 5 |
| 60g | 6 | (x6, y6, θ6) | Keyframe 6 |
| 60g | 7 | (x7, y7, θ7) | Keyframe 7 |

| Self location estimation calculation stage | During reference information search (Search range: narrow) | During reference information search (Search range: wide) |
| --- | --- | --- |
| Degree of confidence in self location | High | Low |
| CPU load factor of self location estimation process | Low | High |
| Frequency of update of global movement plan | High | Low |
| CPU load factor of global movement plan | High | Low |

FIG.12

FIG.13

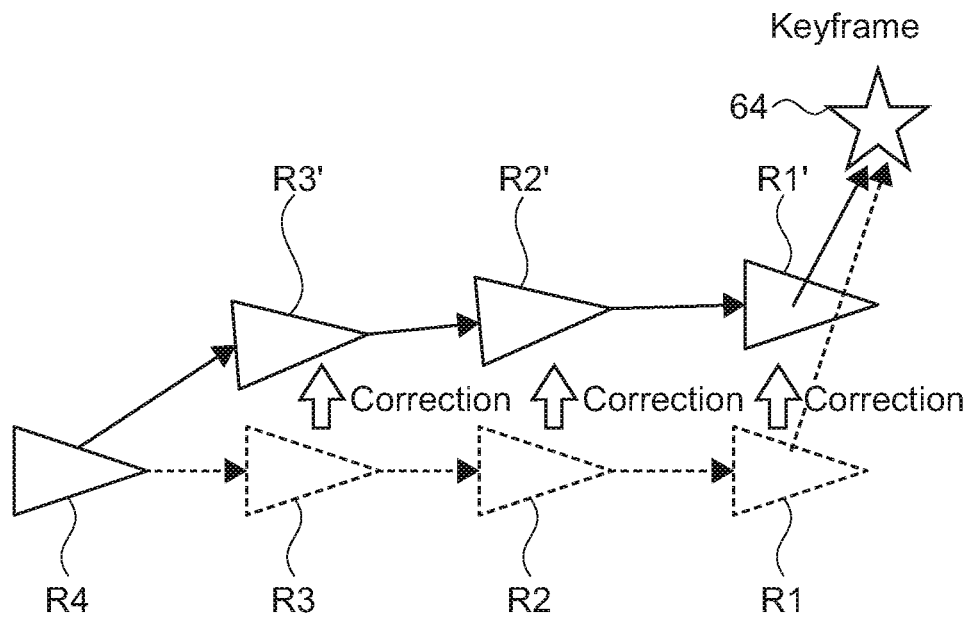

FIG.14

| Self location estimation calculation stage | Find keyframe (correct self location by using loop closing function) |
|---|---|
| Degree of confidence in self location | Low |
| CPU load factor of self location estimation process | Very high |
| Frequency of update of global movement plan | × (Vehicle moves in accordance with local movement plan only) |
| CPU load factor of global movement plan | Zero |

FIG.15

INFORMATION PROCESSING APPARATUS, INFORMATION PROCESSING METHOD, AND MOBILE OBJECT

CROSS REFERENCE TO RELATED APPLICATIONS

This application is a U.S. National Phase of International Patent Application No. PCT/JP2018/040213 filed on Oct. 30, 2018, which claims priority benefit of Japanese Patent Application No. JP 2017-222961 filed in the Japan Patent Office on Nov. 20, 2017. Each of the above-referenced applications is hereby incorporated herein by reference in its entirety.

TECHNICAL FIELD

The present technology relates to an information processing apparatus, an information processing method, a program, and a mobile object for controlling movement of the mobile object.

BACKGROUND ART

Conventionally, technologies of autonomously controlling movement of a mobile object such as a vehicle or a robot have been developed. For example, Patent Literature 1 describes a mobile robot guidance control apparatus. The guidance control apparatus plans a route to a destination of the robot by using map information including information regarding a landmark that characterizes a movement environment. The robot is moved along the route, and location/posture data of the robot is monitored on the basis of an amount of the movement. The location/posture data is appropriately updated by using a location/posture estimation value estimated from a camera image that captures the landmark or the like. Next, the route of the robot is replanned on the basis of a location and a posture of the robot after the update. It is possible to move the robot to its destination by repeating the above-described cycle (See paragraphs [0014], [0021], [0028], [0035], [0089], FIGS. 1A, 1B, and FIG. 12 and the like of Patent Literature 1).

CITATION LIST

Patent Literature

Patent Literature 1: JP H06-259131A

DISCLOSURE OF INVENTION

Technical Problem

As described above, various kinds of processes such as a process of estimating a location/posture of a mobile object and a process of planning a route of the mobile object are executed to control movement of the mobile object. A technology of controlling a processing load necessary for the movement control and stably controlling movement has been desired.

In view of the circumstances as described above, a purpose of the present technology is to provide an information processing apparatus, an information processing method, a program, and a mobile object that are capable of controlling a processing load necessary for movement control and stably controlling movement.

Solution to Problem

In order to achieve the above-described purpose, an information processing apparatus according to an aspect of the present technology includes an estimation unit, a generation unit, and a frequency control unit.

The estimation unit estimates at least one of a location or a posture of a mobile object.

The generation unit generates a movement plan for moving the mobile object.

The frequency control unit controls frequency of update of the movement plan to be performed by the generation unit, on the basis of load index information serving as an index of a load on the estimation unit.

The information processing apparatus controls the frequency of update of the movement plan of the mobile object on the basis of the load index information serving as the index of the load of the estimation process that estimates at least one of the location or the posture of the mobile object. This makes it possible to control a processing load necessary for movement control and stably control movement.

the load index information may include a degree of confidence in an estimation result of the estimation made by the estimation unit. In this case, the frequency control unit may control the frequency of update of the movement plan on the basis of the degree of confidence.

By using the degree of confidence in the location or posture of the mobile object as an index, it is possible to accurately control the processing load necessary for the movement control and stably control the movement.

The frequency control unit may set the frequency of update to be higher as the degree of confidence becomes higher, and may set the frequency of update to be lower as the degree of confidence becomes lower.

This makes it possible to balance a processing load of the location/posture estimation process and a processing load of the movement plan generation process, for example, and this makes it possible to achieve sufficiently stable movement control.

The frequency control unit may linearly change the frequency of update in response to change in the degree of confidence.

This makes it possible to easily control the processing load necessary for the movement control and easily achieve stable movement control.

The generation unit may generate a global movement plan of the mobile object and a local movement plan of the mobile object. In this case, the frequency control unit may control the frequency of update of the global movement plan on the basis of the degree of confidence.

This makes it possible to control a processing load necessary to update the global movement plan, and this makes it possible to appropriately control the whole processing load of the movement control.

The global movement plan may include a route plan of the mobile object to a destination.

This makes it possible to control frequency of update of the route plan, and sufficiently control a processing load necessary to the movement control.

The local movement plan may include a course plan indicating a movement direction of the mobile object from a current location.

For example, by using the course plan, it is possible to control the whole processing load without stopping the mobile object, and it is possible to control movement stably and quickly.

The mobile object may include a behavior sensor that detects behavior information related to behavior of the mobile object. In this case, the estimation unit may execute an estimation process through autonomous navigation on the basis of the behavior information detected by the behavior sensor, and calculate the degree of confidence in the estimation result.

By executing the estimation process through autonomous navigation as described above, it is possible to easily calculate a degree of confidence in the location/posture estimation results.

The mobile object may include a surrounding sensor that detects surrounding information related to an ambient environment around the mobile object. In this case, the estimation unit may decide correction reference information for correcting the estimation result by searching for one or more pieces of reference information related to the ambient environment around the mobile object on the basis of the estimation result, and executing a matching process of the one or more pieces of searched-out reference information and the surrounding information detected by the surrounding sensor.

This makes it possible to correct the location and the posture of the mobile object by using the correction reference information, and this makes it possible to improve accuracy of the movement control.

The estimation unit may set a search range of the reference information on the basis of the degree of confidence.

This makes it possible to set an appropriate search range in accordance with the degrees of confidence in the location and the posture of the mobile object. As a result, it is possible to appropriately correct the location and the posture of the mobile object.

The estimation unit may set the search range to a narrower range as the degree of confidence becomes higher, and may set the search range to a wider range as the degree of confidence becomes lower.

This makes it possible to appropriately correct the location and the posture of the mobile object, and this makes it possible to control movement with high accuracy.

The load index information may include execution information indicating whether or not to execute a correction process of the estimation result on the basis of the correction reference information.

By using the correction process execution information as an index, it is possible to accurately control the processing load necessary for the movement control and stably control movement.

The correction process may be a process of correcting a current estimation result and a past estimation result of the mobile object.

This makes it possible to accurately calculate a route or the like through which the mobile object has passed, and it is possible to accurately generate a map of surroundings of the mobile object or the like. As a result, it is possible to control movement with high accuracy.

The frequency control unit may stop the generation unit from updating the movement plan on the basis of the execution information.

This makes it possible to sufficiently avoid effects or the like caused by increase in the processing load due to execution of the correction process. As a result, it is possible to drastically stabilize the mobile object movement control.

The generation unit may generate a global movement plan of the mobile object and a local movement plan of the mobile object. In this case, the frequency control unit may stop the generation unit from updating the global movement plan on the basis of the execution information.

This makes it possible to sufficiently suppress the processing load necessary to update the global movement plan, and this makes it possible to appropriately control the whole processing load of the movement control.

The estimation unit may determine whether or not to execute the correction process, and may execute the correction process in response to a determination result.

This makes it possible to execute the correction process at an appropriate timing. As a result, it is possible to reduce an unnecessary process, and suppress a processing load, for example.

In the case where it is determined to execute the correction process, the estimation unit may output information to the frequency control unit as the execution information, the information indicating that the correction process is to be executed.

This makes it possible to start controlling the processing load at a timing of determining to execute the correction process, for example, and this makes it possible to stably control movement while avoiding increase in the processing load due to the correction process or the like.

An information processing method according to an aspect of the present technology is executed by a computer system, and includes estimating at least one of a location or a posture of a mobile object.

A movement plan for moving the mobile object is generated.

Frequency of update of the movement plan is controlled on the basis of load index information serving as an index of a load of the estimation process of estimating at least one of the location or the posture of the mobile object.

A program according to an aspect of the present technology causes a computer system to execute:

a step of estimating at least one of a location or a posture of a mobile object;

a step of generating a movement plan for moving the mobile object; and a step of controlling frequency of update of the movement plan on the basis of load index information serving as an index of a load of the estimation process of estimating at least one of the location or the posture of the mobile object.

A mobile object according to an aspect of the present technology includes an estimation unit, a generation unit, a frequency control unit, and a movement control unit.

The estimation unit estimates at least one of a location or a posture of the mobile object.

The generation unit generates a movement plan for moving the mobile object.

The frequency control unit controls frequency of update of the movement plan to be performed by the generation unit, on the basis of load index information serving as an index of a load on the estimation unit.

The movement control unit controls movement of the mobile object on the basis of the generated movement plan.

Advantageous Effects of Invention

As described above, according to the present technology, it is possible to control a processing load necessary for movement control and stably control movement. Note that, the effects described herein are not necessarily limited and may be any of the effects described in the present disclosure.

BRIEF DESCRIPTION OF DRAWINGS

FIG. 4 is a table indicating examples of internal sensors and external sensors.

FIG. 12 is a table indicating relationships between the frequencies of update of the global movement plan and CPU load factors at a stage of searching for the reference information.

FIG. 13 is a graph illustrating an example of a relationship between degrees of confidence and frequencies of update.

FIG. 14 is a schematic diagram illustrating an example of a correction process using a loop closing function.

FIG. 15 is a table indicating a relationship between the frequency of update of the global movement plan and CPU load factors at a stage of executing an estimation value correction process.

MODE(S) FOR CARRYING OUT THE INVENTION

Hereinafter, embodiments of the present technology will be described with reference to the drawings.

[Configuration of Vehicle Control System]

Figure 1A:
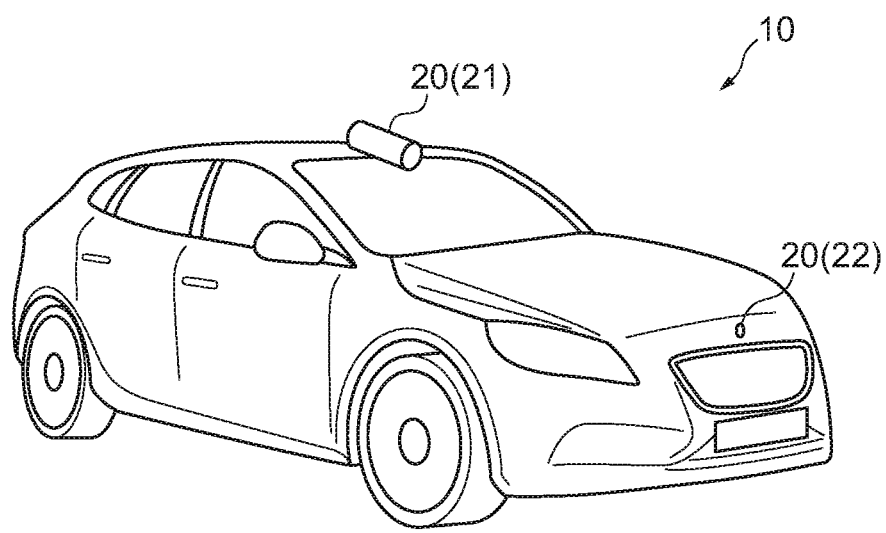
FIGS. 1A and 1B are external views illustrating a configuration example of a vehicle including an autonomous driving control unit according to a first embodiment of the present technology.
Figure 1B:
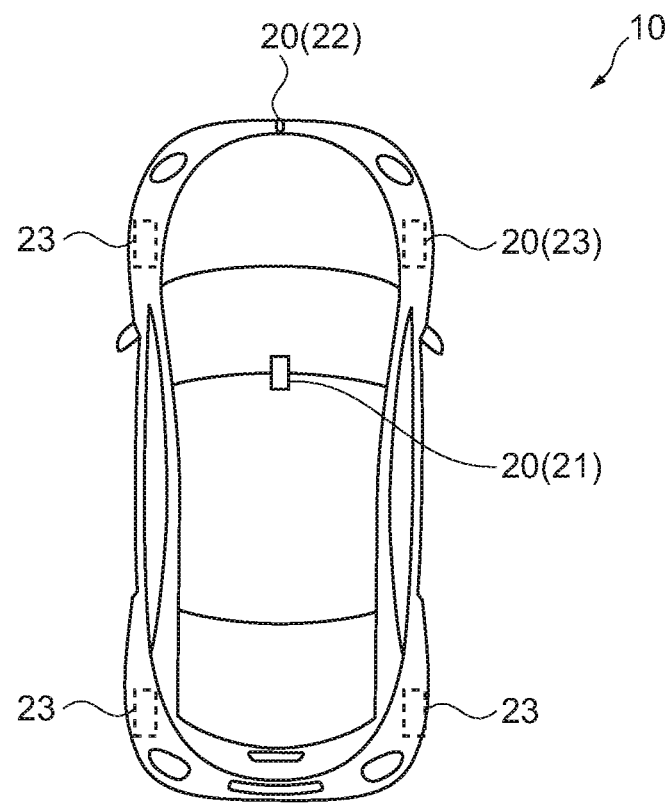

FIGS. 1A and 1B are external views illustrating a configuration example of a vehicle including an autonomous driving control unit according to a first embodiment of the present technology. FIG. 1A is a perspective view illustrating a configuration example of a vehicle 10. FIG. 1B is a schematic diagram obtained when the vehicle 10 is viewed from above. The vehicle 10 has an autonomous driving function capable of automatically driving to a destination. Note that, the vehicle 10 is an example of a mobile object according to the present embodiment.

The vehicle 10 includes various kinds of sensors 20 used for autonomous driving. As an example, FIG. 1A schematically illustrates an imaging apparatus 21 and a distance sensor 22 that face a front side of the vehicle 10, for example. The imaging apparatus 21 and the distance sensor 22 function as external sensors 25 (to be described later). In addition, FIG. 1B schematically illustrates wheel encoders 23 that detect rotation or the like of respective wheels. The wheel encoders 23 function as internal sensors 24 (to be described later). In addition, the vehicle 10 includes various kinds of sensors 20 other than the above-described sensors, and movement of the vehicle 10 is controlled on the basis of output from the sensors 20.

Figure 2:
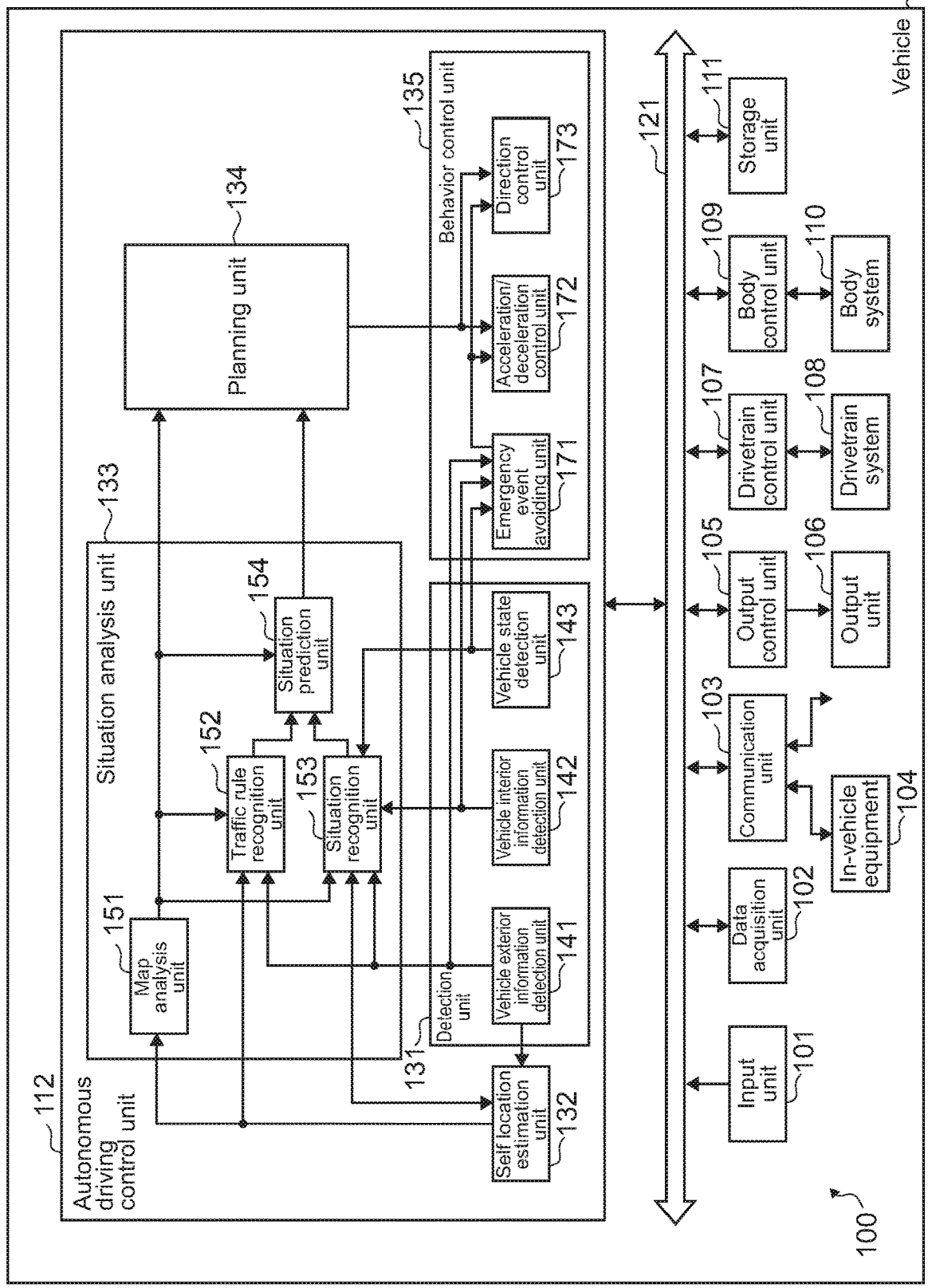
FIG. 2 is a block diagram illustrating a configuration example of a vehicle control system that controls the vehicle.

FIG. 2 is a block diagram illustrating a configuration example of a vehicle control system 100 that controls the vehicle 10. The vehicle control system 100 is a system that is installed in the vehicle 10 and that controls the vehicle 10 in various ways. Note that, hereinafter, the vehicle 10 is referred to as an own car or an own vehicle in the case of distinguishing the vehicle 10 from other vehicles.

The vehicle control system 100 includes an input unit 101, a data acquisition unit 102, a communication unit 103, in-vehicle equipment 104, an output control unit 105, an output unit 106, a drivetrain control unit 107, a drivetrain system 108, a body control unit 109, a body system 110, a storage unit 111, and an autonomous driving control unit 112. The input unit 101, the data acquisition unit 102, the communication unit 103, the output control unit 105, the drivetrain control unit 107, the body control unit 109, the storage unit 111, and the autonomous driving control unit 112 are connected to each other via a communication network 121. For example, the communication network 121 includes a bus or a vehicle-mounted communication network compliant with any standard such as a controller area network (CAN), a local interconnect network (LIN), a local area network (LAN), FlexRay (registered trademark), or the like. Note that, sometimes the units of the vehicle control system 100 may be directly connected to each other without using the communication network 121.

Note that, hereinafter, description of the communication network 121 will be omitted in the case where the units of the vehicle control system 100 communicate with each other via the communication network 121. For example, disclosed simple description indicating that the input unit 101 and the autonomous driving control unit 112 communicate with each other will be given, in the case where the input unit 101 and the autonomous driving control unit 112 communicate with each other via the communication network 121.

The input unit 101 includes an apparatus used by a passenger to input various kinds of data, instructions, or the like. For example, the input unit 101 includes an operation device such as a touchscreen, a button, a microphone, a switch, or a lever, an operation device capable of inputting information by sound, gesture, or the like that is different from manual operation, or the like. Alternatively, for example, the input unit 101 may be external connection equipment such as a remote control apparatus using infrared or another radio wave, or mobile equipment or wearable equipment compatible with operation of the vehicle control system 100. The input unit 101 generates an input signal on the basis of data, an instruction, or the like input by a passenger, and supplies the generated input signal to the respective units of the vehicle control system 100.

The data acquisition unit 102 includes various kinds of sensors or the like for acquiring data to be used in processes performed by the vehicle control system 100, and supplies the acquired data to the respective units of the vehicle control system 100.

For example, the data acquisition unit 102 includes various kinds of sensors for detecting a state or the like of the vehicle 10. Specifically, for example, the data acquisition unit 102 includes a gyro sensor, an acceleration sensor, an inertial measurement unit (IMU), and sensors or the like for detecting an amount of operation of an accelerator pedal, an amount of operation of a brake pedal, an steering angle of a steering wheel, the number of revolutions of an engine, the number of revolutions of a motor, rotational speeds of wheels, and the like.

In addition, for example, the data acquisition unit 102 includes various kinds of sensors for detecting information regarding the outside of the vehicle 10. Specifically, for example, the data acquisition unit 102 includes an imaging apparatus such as a time-of-flight (ToF) camera, a stereo camera, a monocular camera, an infrared camera, or another camera. In addition, for example, the data acquisition unit 102 includes an environment sensor for detecting weather, a meteorological phenomenon, or the like, and a surrounding information detection sensor for detecting objects around the vehicle 10. For example, the environment sensor includes a raindrop sensor, a fog sensor, a sunshine sensor, a snow sensor, or the like. The surrounding information detection sensor includes an ultrasonic sensor, a radar, a LiDAR (Light Detection and Ranging, Laser Imaging Detection and Ranging) sensor, a sonar, or the like.

In addition, for example, the data acquisition unit 102 includes various kinds of sensors for detecting a current location of the vehicle 10. Specifically, for example, the data acquisition unit 102 includes a global navigation satellite system (GNSS) receiver or the like. The GNSS receiver receives satellite signals (hereinafter, referred to as GNSS signals) from a GNSS satellite serving as a navigation satellite.

In addition, for example, the data acquisition unit 102 includes various kinds of sensors for detecting information regarding the inside of the vehicle 10. Specifically, for example, the data acquisition unit 102 includes an imaging apparatus that captures an image of a driver, a biological sensor that detects biological information of the driver, a microphone that collects sound within the interior of the vehicle, or the like. The biological sensor is, for example, disposed on a seat surface, the steering wheel, or the like, and detects biological information of a passenger sitting in a seat or the driver holding the steering wheel.

The communication unit 103 communicates with the in-vehicle equipment 104, various kinds of vehicle exterior equipment, a server, a base station, or the like, transmits data supplied by the respective units of the vehicle control system 100, and supplies the received data to the respective units of the vehicle control system 100. Note that, a communication protocol supported by the communication unit 103 is not specifically limited. It is possible for the communication unit 103 to support plurality of types of communication protocols.

For example, the communication unit 103 establishes wireless connection with the in-vehicle equipment 104 by using a wireless LAN, Bluetooth (registered trademark), near-field communication (NFC), wireless USB (WUSB), or the like. In addition, for example, the communication unit 103 establishes wired connection with the in-vehicle equipment 104 by using Universal Serial Bus (USB), High-Definition Multimedia Interface (HDMI), Mobile High-Definition Link (MHL), or the like via a connection terminal (and a cable if necessary) (not illustrated).

In addition, for example, the communication unit 103 communicates with equipment (for example, an application server or a control server) present on an external network (for example, the Internet, a cloud network, or a company-specific network) via a base station or an access point. In addition, for example, the communication unit 103 communicates with a terminal (for example, a terminal of a pedestrian or a store, or a machine-type communication (MTC) terminal) present in the vicinity of the vehicle 10 by using a peer-to-peer (P2P) technology. In addition, for example, the communication unit 103 carries out V2X communication such as vehicle-to-vehicle communication, vehicle-to-infrastructure communication, vehicle-to-home communication between the vehicle 10 and a home, or vehicle-to-pedestrian communication. In addition, for example, the communication unit 103 includes a beacon receiver, receives a radio wave or an electromagnetic wave transmitted from a radio station installed on a road or the like, and acquires information regarding the current location, traffic congestion, traffic regulation, necessary time, or the like.

The in-vehicle equipment 104 includes mobile equipment or wearable equipment possessed by a passenger, information equipment carried into or attached to the vehicle 10, a navigation apparatus that searches for a route to any destination, and the like, for example.

The output control unit 105 controls output of various kinds of information to the passenger of the vehicle 10 or to an outside of the vehicle 10. For example, the output control unit 105 generates an output signal that includes at least one of visual information (such as image data) or audio information (such as sound data), supplies the output signal to the output unit 106, and thereby controls output of the visual information and the audio information from the output unit 106. Specifically, for example, the output control unit 105 combines pieces of image data captured by different imaging apparatuses included in the data acquisition unit 102, generates a bird's-eye image, a panoramic image, or the like, and supplies an output signal including the generated image to the output unit 106. In addition, for example, the output control unit 105 generates sound data including warning sound, a warning message, or the like with regard to danger such as collision, contact, or entrance into a danger zone, and supplies an output signal including the generated sound data to the output unit 106.

The output unit 106 includes an apparatus capable of outputting the visual information or the audio information to the passenger or the outside of the vehicle 10. For example, the output unit 106 includes a display apparatus, an instrument panel, an audio speaker, headphones, a wearable device such as an eyeglass type display worn by the passenger or the like, a projector, a lamp, or the like. Instead of an apparatus including a usual display, the display apparatus included in the output unit 106 may be, for example, an apparatus that displays the visual information within a field of view of the driver such as a head-up display, a transparent display, an apparatus having an augmented reality (AR) function.

The drivetrain control unit 107 generates various kinds of control signals, supplies them to the drivetrain system 108, and thereby controls the drivetrain system 108. In addition, as necessary, the drivetrain control unit 107 supplies the control signals to structural elements other than the drivetrain system 108 and notifies them of a control state of the drivetrain system 108 or the like.

The drivetrain system 108 includes various kinds of apparatuses related to the drivetrain of the vehicle 10. For example, the drivetrain system 108 includes a driving force generation apparatus for generating driving force of an internal combustion engine, a driving motor, or the like, a driving force transmitting mechanism for transmitting the driving force to wheels, a steering mechanism for adjusting the steering angle, a braking apparatus for generating braking force, an anti-lock braking system (ABS), an electronic stability control (ESC) system, an electric power steering apparatus, or the like.

The body control unit 109 generates various kinds of control signals, supplies them to the body system 110, and thereby controls the body system 110. In addition, as necessary, the body control unit 109 supplies the control signals to structural elements other than the body system 110 and notifies them of a control state of the body system 110 or the like.

The body system 110 includes various kinds of body apparatuses provided to a vehicle body. For example, the body system 110 includes a keyless entry system, a smart key system, a power window apparatus, a power seat, the steering wheel, an air conditioner, various kinds of lamps (such as headlamps, tail lamps, brake lamps, direction-indicator lamps, and fog lamps), and the like.

The storage unit 111 includes read only memory (ROM), random access memory (RAM), a magnetic storage device such as a hard disc drive (HDD) or the like, a semiconductor storage device, an optical storage device, a magneto-optical storage device, or the like, for example. The storage unit 111 stores various kinds of programs, data, and the like used by respective units of the vehicle control system 100. For example, the storage unit 111 stores map data such as a three-dimensional high-accuracy map, a global map and a local map. The high-accuracy map is a dynamic map or the like. The global map has lower accuracy than the high-accuracy map but covers wider area than the high-accuracy map. The local map includes information regarding surroundings of the vehicle 10.

The autonomous driving control unit 112 performs control with regard to autonomous driving such as autonomous travel or driving assistance. Specifically, for example, the autonomous driving control unit 112 performs cooperative control intended to implement functions of an advanced driver-assistance system (ADAS) which include collision avoidance or shock mitigation for the vehicle 10, following driving based on a following distance, vehicle speed maintaining driving, a warning of collision of the vehicle 10, a warning of deviation of the vehicle 10 from a lane, or the like. In addition, for example, it is also possible for the autonomous driving control unit 112 to perform cooperative control intended for autonomous driving that makes the vehicle travel autonomously without depending on the operation of the driver or the like.

The autonomous driving control unit 112 corresponds to an information processing apparatus according to the present embodiment, and includes hardware necessary for a computer such as a CPU, RAM, and ROM, for example. An information processing method according to the present technology is executed when the CPU loads a program according to the present technology into the RAM and executes the program. The program is recorded on the ROM or the like in advance.

The specific configuration of the autonomous driving control unit 112 is not limited. For example, it is possible to use a programmable logic device (PLD) such as a field-programmable gate array (FPGA), or another device such as an application-specific integrated circuit (ASIC).

As illustrated in FIG. 2, the autonomous driving control unit 112 includes a detection unit 131, a self location estimation unit 132, a situation analysis unit 133, a planning unit 134, and a behavior control unit 135. For example, each of the functional blocks is configured when a CPU of the autonomous driving control unit 112 executes a predetermined program.

The detection unit 131 detects various kinds of information necessary to control autonomous driving. The detection unit 131 includes a vehicle exterior information detection unit 141, a vehicle interior information detection unit 142, and a vehicle state detection unit 143.

The vehicle exterior information detection unit 141 performs a process of detecting information regarding an outside of the vehicle 10 on the basis of data or signals from the respective units of the vehicle control system 100. For example, the vehicle exterior information detection unit 141 performs a detection process, a recognition process, a tracking process of objects around the vehicle 10, and a process of detecting distances to the objects. Examples of the detection target object include a vehicle, a person, an obstacle, a structure, a road, a traffic light, a traffic sign, a road sign, and the like. In addition, for example, the vehicle exterior information detection unit 141 performs a process of detecting an ambient environment around the vehicle 10. Examples of the ambient environment around the detection target includes weather, temperature, humidity, brightness, a road surface condition, and the like, for example. The vehicle exterior information detection unit 141 supplies data indicating results of the detection processes to the self location estimation unit 132, a map analysis unit 151, a traffic rule recognition unit 152, and a situation recognition unit 153 of the situation analysis unit 133, an emergency event avoiding unit 171 of the behavior control unit 135, and the like.

The vehicle interior information detection unit 142 performs a process of detecting information regarding an inside of the vehicle on the basis of data or signals from the respective units of the vehicle control system 100. For example, the vehicle interior information detection unit 142 performs an authentication process and a recognition process of the driver, a detection process of a state of the driver, a detection process of a passenger, a detection process of a vehicle interior environment, and the like. Examples of the state of the driver, which is a detection target, include a health condition, a degree of consciousness, a degree of concentration, a degree of fatigue, a gaze direction, and the like. Examples of the vehicle interior environment, which is a detection target, include temperature, humidity, brightness, smell, and the like. The vehicle interior information detection unit 142 supplies data indicating results of the detection processes to the situation recognition unit 153 of the situation analysis unit 133, the emergency event avoiding unit 171 of the behavior control unit 135, and the like.

The vehicle state detection unit 143 performs a process of detecting a state of the vehicle 10 on the basis of data or signals from the respective units of the vehicle control system 100. Examples of the state of the vehicle 10, which is a detection target, includes speed, acceleration, a steering angle, presence/absence of abnormality, a content of the abnormality, a driving operation state, a position and inclination of the power seat, a state of a door lock, states of other vehicle-mounted equipment, and the like. The vehicle state detection unit 143 supplies data indicating results of the detection processes to the situation recognition unit 153 of the situation analysis unit 133, the emergency event avoiding unit 171 of the behavior control unit 135, and the like.

The self location estimation unit 132 performs a process of estimating a location, a posture, and the like of the vehicle 10 on the basis of data or signals from the respective units of the vehicle control system 100 such as the vehicle exterior information detection unit 141 and the situation recognition unit 153 of the situation analysis unit 133. In addition, as necessary, the self location estimation unit 132 generates a local map (hereinafter, referred to as a self location estimation map) to be used for estimating a self location. For example, the self location estimation map may be a high-accuracy map using a technology such as simultaneous localization and mapping (SLAM). The self location estimation unit 132 supplies data indicating a result of the estimation process to the map analysis unit 151, the traffic rule recognition unit 152, and the situation recognition unit 153 of the situation analysis unit 133, and the like. In addition, the self location estimation unit 132 causes the storage unit 111 to store the self location estimation map.

In addition, the self location estimation unit 132 accesses a reference information database 26 (see FIG. 3), on which reference information related to the ambient environment around the vehicle 10 is recorded, and performs a correction process of correcting the estimation results of the location and the posture of the vehicle 10 by using the reference information. Details of the self location estimation unit 132 will be described later with reference to FIG. 3 and the like. According to the present embodiment, the self location estimation unit 132 corresponds to an estimation unit.

The situation analysis unit 133 performs a process of analyzing a situation of the vehicle 10 and a situation around the vehicle 10. The situation analysis unit 133 includes the map analysis unit 151, the traffic rule recognition unit 152, the situation recognition unit 153, and a situation prediction unit 154.

The map analysis unit 151 performs a process of analyzing various kinds of maps stored in the storage unit 111 and constructs a map including information necessary for an autonomous driving process while using data or signals from the respective units of the vehicle control system 100 such as the self location estimation unit 132 and the vehicle exterior information detection unit 141 as necessary. The map analysis unit 151 supplies the constructed map to the traffic rule recognition unit 152, the situation recognition unit 153, the situation prediction unit 154, and the planning unit 134.

The traffic rule recognition unit 152 performs a process of recognizing traffic rules around the vehicle 10 on the basis of data or signals from the respective units of the vehicle control system 100 such as the self location estimation unit 132, the vehicle exterior information detection unit 141, and the map analysis unit 151. The recognition process makes it possible to recognize locations and states of traffic lights around the vehicle 10, contents of traffic control around the vehicle 10, a drivable lane, and the like, for example. The traffic rule recognition unit 152 supplies data indicating a result of the recognition process to the situation prediction unit 154 and the like.

The situation recognition unit 153 performs a process of recognizing situations related to the vehicle 10 on the basis of data or signals from the respective units of the vehicle control system 100 such as the self location estimation unit 132, the vehicle exterior information detection unit 141, the vehicle interior information detection unit 142, the vehicle condition detection unit 143, and the map analysis unit 151. For example, the situation recognition unit 153 performs a process of recognizing a situation of the vehicle 10, a situation around the vehicle 10, a situation of the driver of the vehicle 10, and the like. In addition, as necessary, the situation recognition unit 153 generates a local map (hereinafter, referred to as a situation recognition map) to be used for recognizing the situation around the vehicle 10. For example, the situation recognition map may be an occupancy grid map.

Examples of the situation of the vehicle 10, which is a recognition target, include a location, a posture, and movement (such as speed, acceleration, or a movement direction, for example) of the vehicle 10, presence/absence of abnormality, contents of the abnormality, and the like. Examples of the situation around the vehicle 10, which is a recognition target, include types and locations of surrounding still objects, types, locations, and movement (such as speed, acceleration, and movement directions, for example) of surrounding moving objects, structures of surrounding roads, conditions of road surfaces, ambient weather, temperature, humidity, brightness, and the like. Examples of the state of the driver, which is a recognition target, include a health condition, a degree of consciousness, a degree of concentration, a degree of fatigue, movement of gaze, driving operation, and the like.

The situation recognition unit 153 supplies data indicating a result of the recognition process (including the situation recognition map as necessary) to the self location estimation unit 132, the situation prediction unit 154, and the like. In addition, the situation recognition unit 153 causes the storage unit 111 to store the situation recognition map.

The situation prediction unit 154 performs a process of predicting a situation related to the vehicle 10 on the basis of data or signals from the respective units of the vehicle control system 100 such as the map analysis unit 151, the traffic rule recognition unit 152, and the situation recognition unit 153. For example, the situation prediction unit 154 performs a process of predicting a situation of the vehicle 10, a situation around the vehicle 10, a situation of the driver, and the like.

Examples of the situation of the vehicle 10, which is a prediction target, includes behavior of the vehicle, occurrence of abnormality, a drivable distance, and the like. Examples of the situation around the vehicle 10, which is a prediction target, includes behavior of moving objects, change in states of traffic lights, change in environments such as weather, and the like around the vehicle 10. Examples of the situation of the driver, which is a prediction target, includes behavior, a health condition, and the like of the driver.

The situation prediction unit 154 supplies data indicating results of the prediction processes to the planning unit 134 in addition to the data from the traffic rule recognition unit 152 and the situation recognition unit 153.

The planning unit 134 generates a movement plan for moving the vehicle 10. Here, the movement plan includes various kinds of plans related to a route, behavior, and the like for automatically driving the vehicle 10. The planning unit 134 plans the route, behavior, and the like (a movement plan) of the vehicle 10 on the basis of data or signals from the respective units of the vehicle control system 100 such as the map analysis unit 151 and the situation recognition unit 154. In addition, the planning unit 134 supplies data such as the route and the behavior of the vehicle 10 to an acceleration/deceleration control unit 172, a direction control unit 173, and the like of the behavior control unit 135. Details of the planning unit 134 will be described later with reference to FIG. 3 and the like. According to the present embodiment, the planning unit 134 corresponds to a generation unit.

The behavior control unit 135 controls behavior of the vehicle 10. The behavior control unit 135 includes the emergency event avoiding unit 171, the acceleration/deceleration control unit 172, and the direction control unit 173.

The emergency event avoiding unit 171 performs a process of detecting collision, contact, entrance into a danger zone, or an emergency event such as abnormality in the driver or abnormality in the vehicle 10 on the basis of detection results obtained by the vehicle exterior information detection unit 141, the vehicle interior information detection unit 142, and the vehicle state detection unit 143. In the case where occurrence of an emergency event is detected, the emergency event avoiding unit 171 plans behavior of the vehicle 10 such as a quick stop or a quick turn for avoiding the emergency event. The emergency event avoiding unit 171 supplies data indicating the planned behavior of the vehicle 10 to the acceleration/deceleration control unit 172, the direction control unit 173, or the like.

The acceleration/deceleration control unit 172 controls acceleration/deceleration to achieve the behavior of the vehicle 10 planned by the planning unit 134 or the emergency event avoiding unit 171. For example, the acceleration/deceleration control unit 172 computes a control goal value of the driving force generation apparatus or the braking apparatus to achieve the planned acceleration, deceleration, or quick stop, and supplies a control instruction indicating the computed control goal value to the drivetrain control unit 107.

The direction control unit 173 controls a direction to achieve the behavior of the vehicle 10 planned by the planning unit 134 or the emergency event avoiding unit 171. For example, the direction control unit 173 computes a control goal value of the steering mechanism to achieve a driving course or quick turn planned by the planning unit 134 or the emergency event avoiding unit 171, and supplies a control instruction indicating the computed control goal value to the drivetrain control unit 107. According to the present embodiment, it is possible to implement a movement control unit when the acceleration/deceleration control unit 172 and the direction control unit 173 operate in cooperation with each other.

Figure 3:
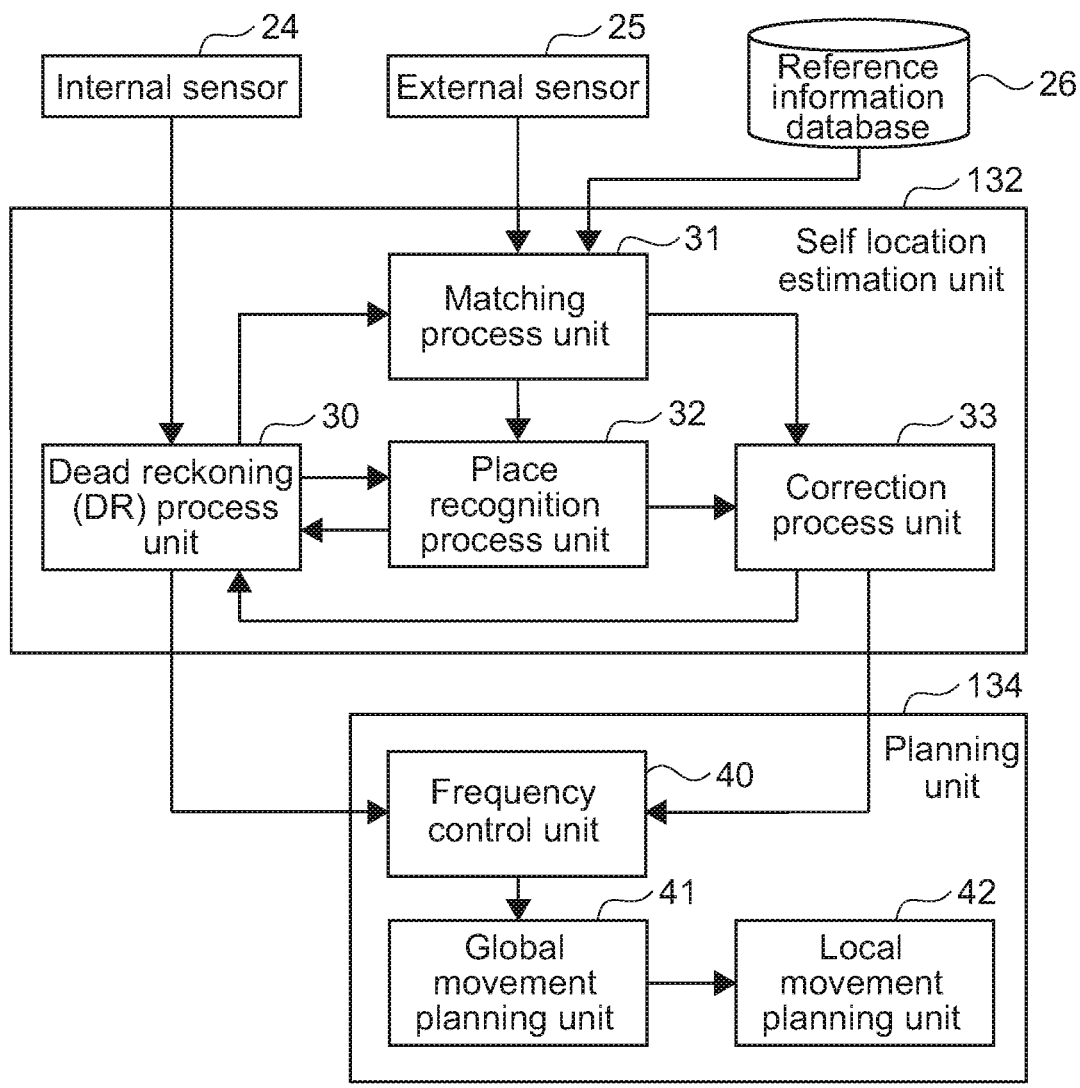
FIG. 3 is a block diagram illustrating configuration examples of a self location estimation unit and a planning unit illustrated in FIG. 2.

FIG. 3 is a block diagram illustrating configuration examples of the self location estimation unit 132 and the planning unit 134 illustrated in FIG. 2. As illustrated in FIG. 3, the internal sensor 24, the external sensor 24, and the reference information database 26 supplies the self location estimation unit 132 with respective pieces of information necessary to estimate a self location of the vehicle. The internal sensor 24 and the external sensor 25 may include the sensors 20 of the data acquisition unit 102.

FIG. 4 is a table indicating examples of the internal sensor 24 and the external sensor 25. The table illustrated in FIG. 4 indicates types of recognizers, physical quantities obtained by using the recognizers, whether it is possible to measure absolute values of locations/postures, and detection rates, with regard to each of the internal sensor 24 and the external sensor 25.

The internal sensor 24 is a sensor that detects behavior information related to behavior of the vehicle 10. According to the present embodiment, physical quantities such as speed, acceleration, a relative location (an amount of movement), and an angular velocity of the vehicle 10 are detected as the behavior information of the vehicle 10. These physical quantities are amounts that are sequentially detectable by the internal sensor 24 at high acquisition rates in response to movement (behavior) of the vehicle 10. As described above, it can be said that the internal sensor 24 does not measure a location (an absolute location) of the vehicle 10 on a map or an orientation (an absolute posture) of the vehicle 10, but detects a state of the vehicle 10 itself, that is, an internal state. According to the present embodiment, the internal sensor 24 corresponds to a behavior sensor.

As illustrated in FIG. 4, the internal sensor 24 includes an acceleration sensor, a gyro sensor, an inertial measurement unit (IMU), the wheel encoders 23, and the like. In addition, it is also possible to detect behavior (an amount of movement and a movement direction) and the like of the vehicle 10 by using visual SLAM or the like. The visual SLAM uses images captured by various kinds of cameras. In this case, the internal sensor 24 also includes the cameras or the like. In addition, the type of the internal sensor 24 is not limited. Sensors that detect amounts of operation of the accelerator pedal, the brake pedal, the steering wheel, and the like, and sensors that detect the number of revolutions of the engine, the number of revolutions of the motor, and the like may be appropriately used.

The behavior information detected by the internal sensors 24 is supplied to a DR process unit 30 of the self location estimation unit 132 via the vehicle state detection unit 143 and the situation recognition unit 153 as illustrated in FIGS. 1A and 1B. Note that, the vehicle state detection unit 143 and the situation recognition unit 153 are not illustrated in FIG. 3.

The external sensor 25 is a sensor that detects surrounding information related to an ambient environment around the vehicle 10. According to the present embodiment, image information, depth information (point cloud data), and the like of roads, buildings, and the like around the vehicle 10 are detected as the surrounding information of the vehicle 10. Absolute values or the like of the location and the posture of the vehicle 10 in a map coordinate system are detected by performing a place recognition process or the like on the basis of the surrounding information. Details thereof will be described later.

As illustrated in FIG. 4, the external sensor 25 includes various kinds of the imaging apparatuses 21 (such as the stereo camera or the monocular camera) for detecting information regarding an outside of the vehicle 10, the distance sensor 22 (such as the ToF sensor or the LiDAR sensor) for detecting objects around the vehicle 10. The types and the like of the external sensors 25 are not limited. For example, any sensor capable of detecting surrounding information of the vehicle 10 may be used as the external sensor 25.

The surrounding information detected by the external sensors 25 is supplied to a matching process unit 31 of the self location estimation unit 132 via the vehicle exterior information detection unit 141 as illustrated in FIGS. 1A and 1B. Note that, the vehicle exterior information detection unit 141 is not illustrated in FIG. 3. According to the present embodiment, the external sensor 25 corresponds to a surrounding sensor.

The reference information database 26 is a database that stores a plurality of pieces of reference information, and is installed in the storage unit 111. The reference information is information to be referred to by the self location estimation unit 132. The reference information is acquired before a reference process is performed, and then stored in the reference information database 26.

The reference information is information in which image information that captures a driving environment where the vehicle 10 or the like drives is associated with an image capturing location and an image capturing direction of the image information, for example. In addition, for example, information in which depth information of the driving environment is associated with a measurement location and a measurement direction of the depth information may be used as the reference information.

In addition, the specific configuration of the reference information is not limited. For example, instead of the image information or the depth information, it is possible to store image feature points (positions and feature quantities of the feature points) detected in the image information, point cloud registration information detected in the depth information, or the like. Hereinafter, sometimes the image information, the depth information, or the like stored as the reference information is referred to as a keyframe, an acquisition location of the image information and the depth information is referred to as an acquisition location of the keyframe, and an acquisition direction of the image information and the depth information is referred to as an acquisition direction of the keyframe.

According to the present embodiment, the reference information is acquired by a vehicle (hereinafter, referred to as a map generation vehicle) other than the vehicle 10. For example, the map generation vehicle acquires the keyframe (the image information and the depth information) of a front side of the map generation vehicle by using a camera or the like installed in the map generation vehicle itself. The acquired keyframe is uploaded to a server or the like in association with a location and a posture of the map generation vehicle in the map coordinate system obtained when the keyframe is acquired.

The method of acquiring the location and the posture of the map generation vehicle is not limited. For example, the location and the posture of the map generation vehicle may be acquired on the basis of at least one or more of a global navigation satellite system (GNSS) signal (output from a GPS sensor) that is a satellite signal from a navigation satellite, a geomagnetic sensor, wheel odometry, or the SLAM. In addition, the number of map generation vehicles or the like is not limited. It is possible to use one or more map generation vehicles appropriately.

The vehicle 10 configures the reference information database 26 by appropriately downloading, to the storage unit 111, the reference information uploaded to the server or the like. Note that, the present technology is not limited to the case where the vehicle 10 includes the reference information database 26. For example, it is possible to install the reference information database 26 in the server or the like. In this case, the vehicle 10 appropriately accesses the server or the like, and refers to or downloads a necessary piece of the reference information.

As illustrated in FIG. 3, the self location estimation unit 132 includes the dead reckoning (DR) process unit 30, the matching process unit 31, a place recognition process unit 32, and a correction process unit 33. Hereinafter, the dead reckoning process unit 30 is referred to as the DR process unit 30.

According to the present embodiment, the self location estimation unit 132 executes a process of stochastically estimating state quantities including the location and the posture of the vehicle 10. In this case, the state quantities of the vehicle 10 are treated as random variables represented by probability distribution (probability density). For example, a probability that the vehicle 10 is in a certain location, a probability that the vehicle 10 faces a certain direction, and the like are calculated.

Figure 10:
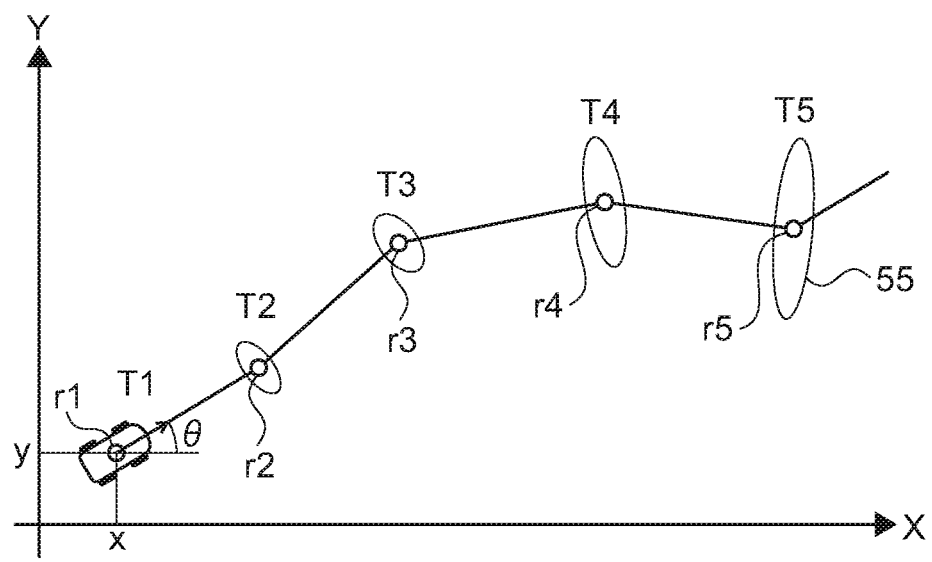
FIG. 10 is a schematic diagram illustrating an example of behavior of the vehicle.

With regard to the state quantities of the vehicle 10, a location (r=(x,y)) of the vehicle 10 in the map coordinate system (an XY coordinate system), and an orientation θ of the vehicle 10 on an XY plane are set (see FIG. 10). The present technology is not limited thereto. For example, it is also possible to set a position z of the vehicle in a height direction, angles indicating the posture such as a pan rotation, a roll rotation, or a yaw rotation, and the like as the state quantities of the vehicle 10. In addition, it is also possible to set state quantities including other parameters such as speed of the vehicle 10.

For example, a process using a Kalman filter, a particle filter, or the like is used as an algorithm for executing the stochastic estimation process. Such a filter is appropriately designed in accordance with the state quantities or the like serving as estimation targets, for example. Of course, the present technology is not limited thereto. Any process or the like can be used as long as it is possible to estimate the self location. Hereinafter, the Kalman filter is used as an example.

In the process using the Kalman filter, an estimation value $R_{n|m}$ of the state quantity, and an error covariance matrix $P_{n|m}$ indicating accuracy of the estimation value $R_{n|m}$ are calculated, for example. Here, $R_{n|m}$ represents an estimation value of the state quantity of time n estimated at time m, and $P_{n|m}$ represents an error covariance matrix of the time n estimated at the time m.

In addition, in the Kalman filtering, a prediction process and an update process are performed in each time step. The prediction process is a process of predicting a current estimation value $R_{t|t-1}$ and a current error covariance matrix $P_{t|t-1}$ of one period of time ago, on the basis of results $(R_{t-1|t-1}, P_{t-1|t-1})$ obtained before the one period of time (time t−1) from a current time (time t), for example. The update process is a process of updating the results $(R_{t|t-1}, P_{t|t-1})$ of the prediction process on the basis of measurement values related to the state quantity, and calculating an estimation value $R_{t|t}$ and an error covariance matrix $P_{t|t}$ of the current time t, for example.

For example, it is assumed that the measurement values related to the state quantities are acquired in a certain time step. In this case, the prediction process and the update process are performed, and the estimation value $R_{t|t}$ and the error covariance matrix $P_{t|t}$ are calculated as estimation results. Alternatively, for example, it is also possible to execute only the prediction process in the case where the measurement values related to the state quantities are not acquired or other cases. In such a case, the estimation value $R_{t|t-1}$ and the error covariance matrix $P_{t|t-1}$ are calculated as estimation results.

As described above, in the process using the Kalman filter, it is possible to appropriately calculate the respective estimation results through the prediction process and the update process in accordance with situations. Hereinafter, sometimes the reference signs of the estimation value $R_{n|m}$ and the error covariance matrix $P_{n|m}$ are omitted, and they are simply referred to as the estimation value and the error covariance matrix.

The DR process unit 30 estimates the location and the posture of the vehicle 10 through a dead reckoning process.

Here, the dead reckoning process is a process of estimating the location and the posture of the vehicle 10 on the basis of behavior (behavior information) of the vehicle 10 itself detected by the internal sensor 24. According to the present embodiment, the dead reckoning process corresponds to the autonomous navigation.

For example, a process of calculating an amount of movement from the location of the vehicle 10 at the time t−1 on the basis of amounts of rotation of the wheels detected by the wheel encoders 23 at the time t, and estimating a relative location of the vehicle 10 at the time t is executed. Note that, an actual dead reckoning process appropriately uses various kinds of behavior information detected by respective sensors included in the internal sensor 24 in addition to the wheel encoders 23.

According to the present embodiment, the dead reckoning process makes it possible to achieve the above-described prediction process using the Kalman filter. Therefore, by performing the dead reckoning process, it is possible to execute the process of predicting the estimation value of the state quantity of the vehicle 10 and the error covariance matrix.

In addition, the DR process unit 30 calculates a degree of confidence in the estimation value of the state quantity of the vehicle 10 on the basis of the error covariance matrix. The degree of confidence is a quantity indicating certainty of the estimation value of the state quantity of the vehicle 10. For example, as the location r of the vehicle 10 has a smaller error (dispersion of probability distribution), a probability that the vehicle 10 is in the estimated location r becomes higher, and a degree of confidence in the location r becomes larger.

According to the present embodiment, a degree of confidence that represents the certainty of the entire state quantities is calculated. For example, it is possible to calculate degrees of confidence in respective state variables (such as the location r and the orientation θ) included in the state quantities from diagonal elements of the error covariance matrix. The whole degree of confidence is calculated on the basis of the degrees of confidence in the respective state variables. Alternatively, it is possible to use any method as long as it is possible to calculate the degree of confidence in the estimation value.

As described above, the DR process unit 30 executes the estimation process using the dead reckoning on the basis of the behavior information detected by the internal sensor 24, and calculates the degree of confidence in the estimation value. The calculated estimation value and the degree of confidence are supplied to the matching process unit 31. In addition, the degree of confidence is supplied to a frequency control unit 40 of the planning unit 134 (to be described later).

The matching process unit 31 searches for one or more pieces of the reference information related to the ambient environment around the vehicle 10 on the basis of the estimation result (the estimation value) of the DR process unit 30. For example, the reference information is searched out from the reference information database 26 while using the location of the vehicle 10 designated by the estimation value as a criterion. As a result, the reference information acquired near the current location of the vehicle 10 is searched out.

In addition, the matching process unit 31 decides correction reference information for correcting the estimation value by executing a process of matching one or more pieces of the searched-out reference information and the surrounding information detected by the external sensor 25. For example, a pieces of the reference information whose matching rate satisfies a predetermined condition is decided as the correction reference information. Note that, sometimes the correction reference information may not be decided in the case where the matching rates of the respective pieces of reference information do not satisfy the predetermined condition.

For example, any matching process such as feature point matching, template matching, or image scanning is used as the matching process. In addition, a specific method of the matching process is not limited. For example, it is possible to appropriately execute a matching process using machine learning or the like.

The place recognition process unit 32 calculates the current location of the vehicle 10 on the basis of the correction reference information and the surrounding information. For example, the place recognition process is executed on the basis of a result of matching the correction reference information and the surrounding information, an acquisition location and an acquisition posture of the correction reference information, and the like, and the absolute values of the location and the posture of the vehicle 10 in the map coordinate system are calculated. In other words, it can be said that the location and the posture of the vehicle 10 are measured on the basis of the correction reference information.

According to the present embodiment, the place recognition process makes it possible to achieve the above-described update process using the Kalman filter. Therefore, by performing the place recognition process, it is possible to execute the process of updating the estimation value of the state quantity of the vehicle 10 and the error covariance matrix. The updated estimation value and the updated error covariance matrix are output to the DR process unit 30, and are used for a subsequent prediction process.

Note that, it is also possible for the place recognition process unit 32 to execute the process of updating the estimation value and the error covariance matrix or the like on the basis of the self location or the like of the vehicle 10 detected by the GPS sensor or the like, for example. For example, it is possible to drastically improve accuracy of the estimation process by using both the self location detected through the place recognition process based on the correction reference information and the self location detected by the GPS sensor.

The correction process unit 33 executes a process of correcting the estimation values of the location and the posture of the vehicle 10. The correction process is a process of correcting the estimation process while using the location and the posture (the absolute values in the map coordinate system) of the vehicle 10 calculated from the correction reference information, as criteria, for example. In other words, it can be said that the correction process unit 33 corrects the estimation results on the basis of the correction reference information.

According to the present embodiment, a process of correcting current and past estimation values of the vehicle 10 is executed as the correction process. Therefore, the correction process unit 33 corrects trajectories through which the vehicle 10 has passed before. The above-described correction process including correction of past estimation values is generally referred to as a loop closing function (or a loop closure function). Details of the loop closing function will be described later. The corrected estimation values (correction results) are supplied to the DR process unit 30 and are appropriately fed back to the process using the Kalman filter.

Note that, the correction process unit 33 determines whether or not to execute the correction process on the basis of a predetermined determination condition. The predetermined determination condition is appropriately set in such a manner that the correction process is to be executed at an appropriate timing under an appropriate situation, for example. In addition, information (determination information) regarding a determination result indicating whether or not to execute the correction process is supplied to the frequency control unit 40 of the planning unit 134 (to be described later). According to the present embodiment, the determination information corresponds to execution information indicating whether or not to execute the correction process of the estimation result based on the correction reference information.

The planning unit 134 includes the frequency control unit 40, a global movement planning unit 41, and a local movement planning unit 42.

The frequency control unit 40 controls frequency of update of a movement plan to be performed by the planning unit 134 on the basis of load index information. Here, the load index information is information serving as an index of a load on the self location estimation unit 132. Specifically, the load index information is information serving as an index of a processing load necessary for the estimation process to be performed by the self location estimation unit 132. For example, information indicating how much the processing load of the estimation process increases is used as the load index information.

For example, the degree of confidence in the estimation result (the estimation value) obtained by the DR process unit 30 is used as the load index information. In this case, the frequency control unit 40 controls frequency of update of a movement plan on the basis of the degree of confidence. In addition, for example, the determination information related to the correction process performed by the correction process unit 33 is used as the load index information. The frequency control unit 40 stops the planning unit 134 from updating the movement plan on the basis of the determination information.

Note that, the planning unit 134 generates a global movement plan and a local movement plan as the respective movement plans. According to the present embodiment, a process of controlling frequency of update of the global movement plan is executed on the basis of the above-described load index information. Details of the update frequency control based on the load index information (the degree of confidence and the determination information) will be described later.

The global movement planning unit 134 generates the global movement plan, and updates the global movement plan. The global movement plan is a plan for moving the vehicle 10 in a wide area. According to the present embodiment, a route plan to a destination of the vehicle 10 is generated as the global movement plan. The route plan is a plan including information indicating a way (a path) the vehicle 10 should follow, or the like. The route plan makes it possible to designate roads through which the vehicle 10 travels from a current location to the destination, whether to turn right or left at an intersection, a direction of a forked road, and the like.

Figure 5:
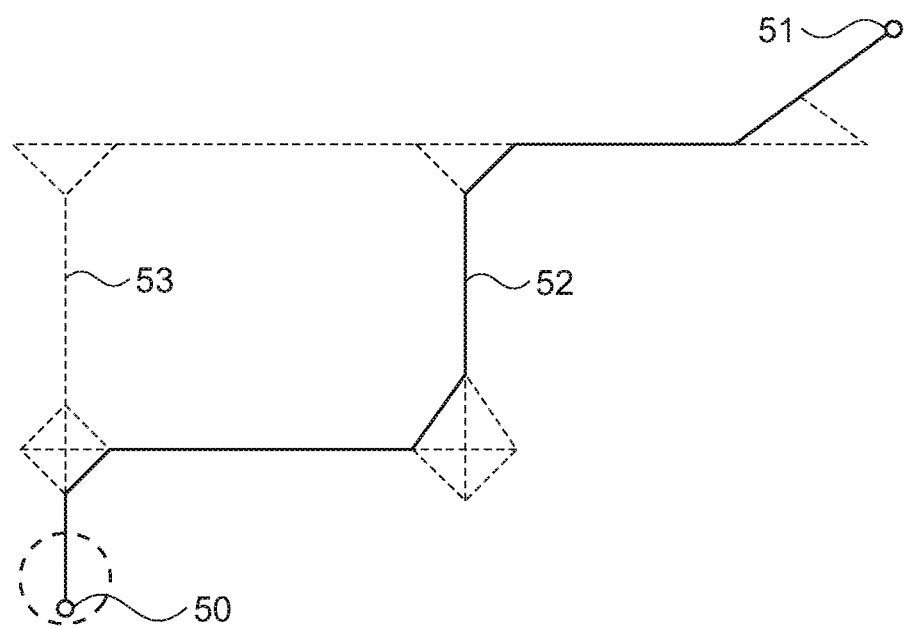
FIG. 5 is a schematic diagram illustrating an example of a route plan.

FIG. 5 is a schematic diagram illustrating an example of the route plan. FIG. 5 schematically illustrates a planned route 52 of the vehicle 10 from a current location 50 to a destination 51. The global movement planning unit 41 generates the route plan with reference to the location (the current location 50) of the vehicle 10 on the basis of the global map including information regarding a road 53 from the current location 50 of the vehicle 10 to the destination 51 or the like, for example. In addition, the route is changed, that is, the route plan (the global movement plan) is updated in accordance with movement of the vehicle 10, traffic jam information regarding the planned route 52, and the like. The updated route plan is supplied to the local movement planning unit 42.

The local movement planning unit 134 generates a local movement plan, and updates the local movement plan. The local movement plan is a plan for moving the vehicle 10 in a narrow area around the vehicle 10. According to the present embodiment, a course plan is generated as the local movement plan. The course plan indicates a movement direction of the vehicle 10 from the current location 50. With regard to the course plan, a course of the vehicle 10 including a movement direction, speed, and the like for safely moving the vehicle 10 in accordance with the planned route 52 is planned, for example.

Figure 6:
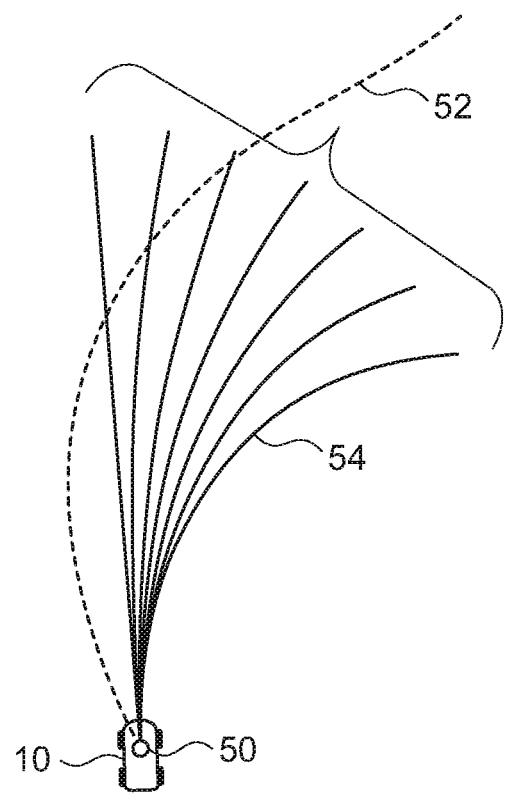
FIG. 6 is a schematic diagram illustrating examples of a course plan.

FIG. 6 is a schematic diagram illustrating examples of the course plan. FIG. 6 schematically illustrates candidates for a course 54 of the vehicle 10 in the current location 50 illustrated in FIG. 5. For example, the courses 54 of the vehicle are calculated in such a manner that the courses 54 are made if a steering angle (an amount of rotation of the steering wheel) is manipulated on the basis of the current posture (the orientation 19), the current speed, and the like of the vehicle 10. FIG. 6 illustrates the plurality of course candidates 54 with different steering angles. A course 54 capable of causing the vehicle 10 to follow the planned route 52 in the best way is appropriately selected from among the candidates, and the selected course 54 is used as the course plan.

Note that, a method of generating the course plan is not limited. For example, in the case where there is an obstacle, another vehicle, or the like near the vehicle 10, it is possible to appropriately calculate a course 54 for avoiding them. In addition, for example, it is also possible to appropriately calculate a course 54 along lines on a road through which the vehicle 10 is traveling, a course 54 for following another vehicle ahead, or the like.

As described above, the course plan has to handle the obstacle, the traffic situation, and the like around the vehicle 10 in addition to change in the location and the posture of the vehicle 10. Therefore, the course plan is updated frequently. The updated activation plan is supplied to the acceleration/deceleration control unit 172 and the direction control unit 173 of the behavior control unit 135 illustrated in FIGS. 1A and 1B.

[Basic Behavior of Self Location Estimation Unit and Planning Unit]

Figure 7:
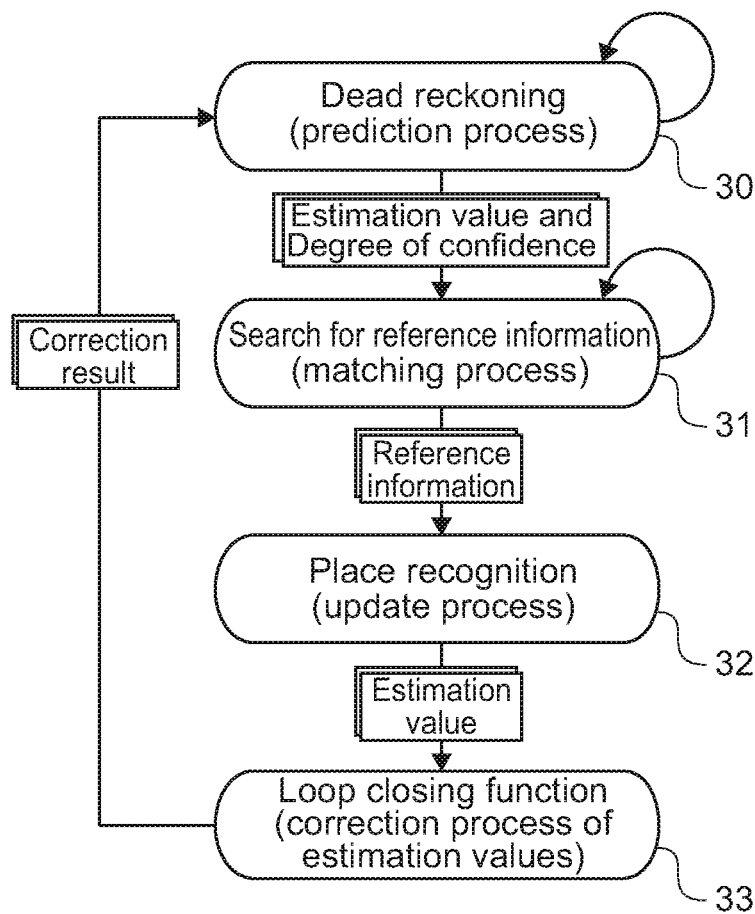
FIG. 7 is a schematic diagram illustrating an overview of basic behavior of the self location estimation unit.
Figure 8:
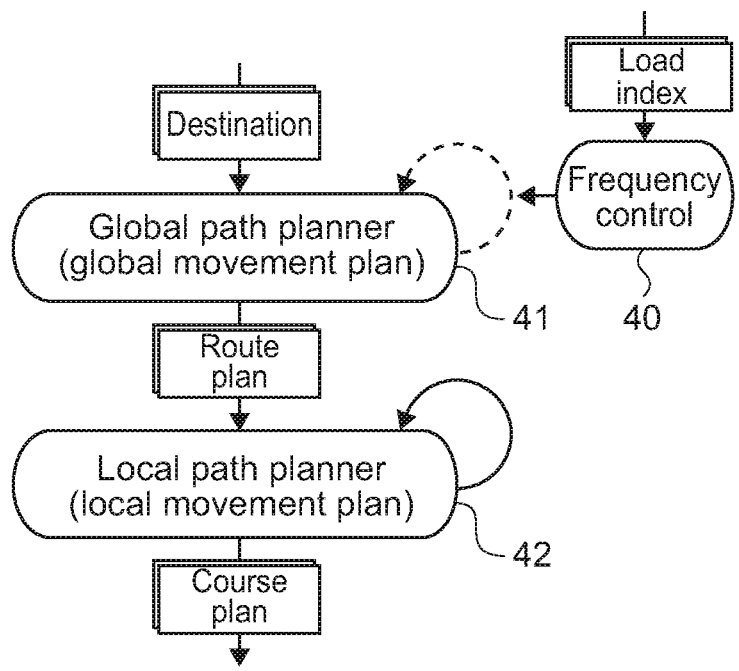
FIG. 8 is a schematic diagram illustrating an overview of basic behavior of the planning unit.

FIG. 7 is a schematic diagram illustrating an overview of basic behavior of the self location estimation unit 132. FIG. 8 is a schematic diagram illustrating an overview of basic behavior of the planning unit 134. FIG. 7 and FIG. 8 schematically illustrates respective functional blocks included in the self location estimation unit 132 and the planning unit 134 described with reference to FIG. 3, and information exchanged between the functional blocks.

As illustrated in FIG. 7, the DR process unit 30 of the self location estimation unit 132 repeatedly executes the dead reckoning process with a predetermined frequency (at a predetermined processing rate). In each repetition, the estimation values of the state quantities (the location and the posture) of the vehicle 10 and the degrees of confidence (the error covariance matrices) are calculated.

In addition, the matching process unit 31 repeatedly executes the matching process independently of the DR process unit 30. At this time, information for searching for the reference information such as the estimation values or the degrees of confidence is appropriately acquired from the DR process unit 30. In the case where the matching has succeeded, the place recognition process unit 32 calculates the absolute values of the location and the posture of the vehicle 10, and updates the estimation values and the error covariance matrices.

When the place recognition process is completed, the correction process unit 33 determines whether or not to execute the correction process. In the case where it is determined to execute the correction process, the correction process is executed by using the loop closing function while using the updated estimation values as criteria. Next, a result of the correction process is fed back to the DR process unit 30.

As illustrated in FIG. 8, the planning unit 134 repeatedly executes a global movement plan generation process (a global path planner) and a local movement plan generation process (a local path planner) with independent frequencies, and updates respective movement plans with different frequencies. For example, frequency of update of the local movement plan is set higher than the global movement plan.

In addition, as described above, the frequency control unit 40 appropriately controls frequency of update of the global movement plan on the basis of indices (load index information) of a processing loads of the respective processes performed by the self location estimation unit 132 described with reference to FIG. 7. On the other hand, update of the local movement plan is constantly performed with a predetermined frequency.

[Update Frequency Control]

Figure 9:
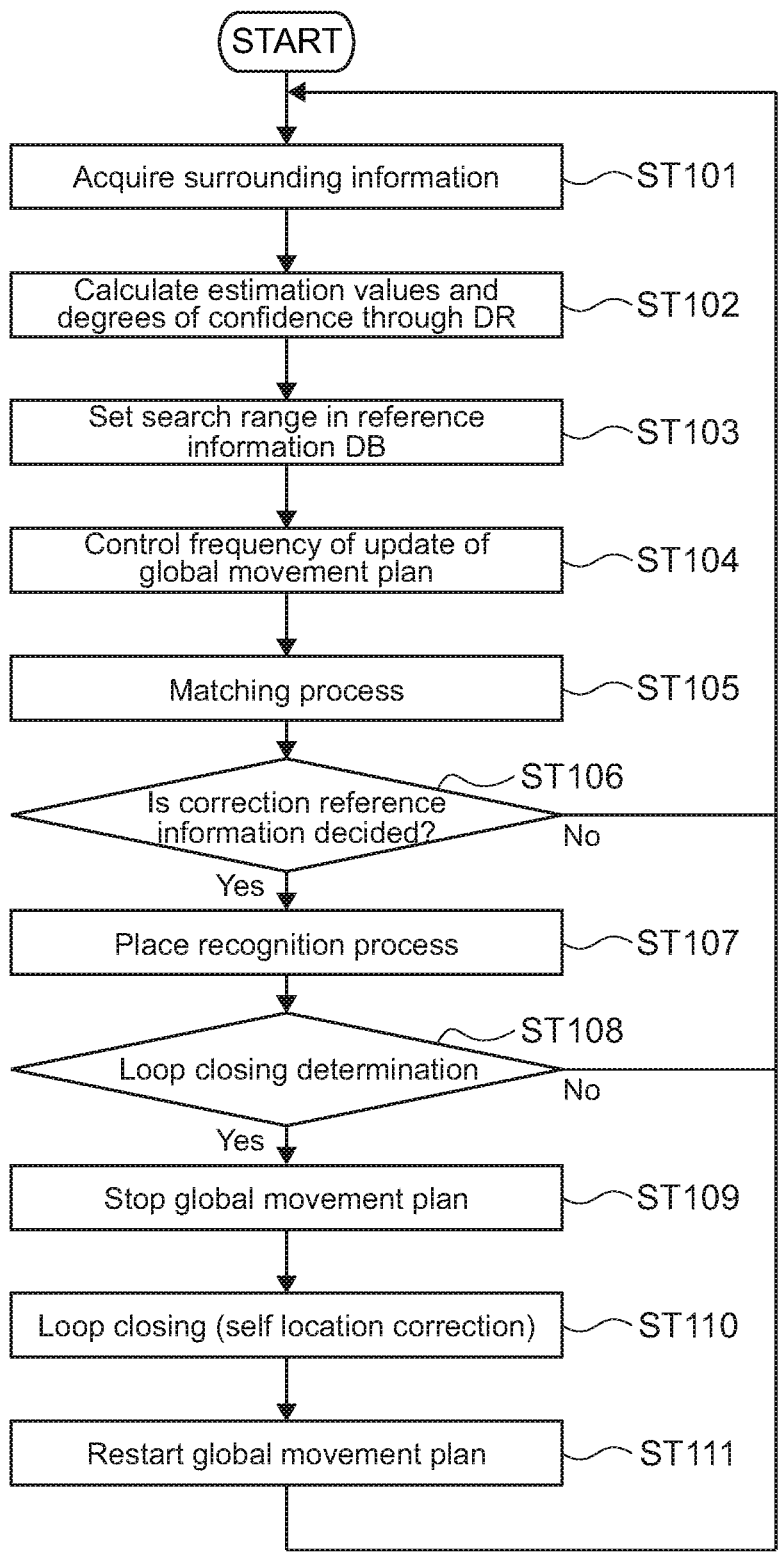
FIG. 9 is a flowchart illustrating an example of control over frequency of update of a global movement plan.

FIG. 9 is a flowchart illustrating an example of controlling the frequency of update of the global movement plan. Note that, for example, this process starts when the vehicle 10 is activated and operation to start driving is performed, that is, when an ignition switch, a power switch, a start switch, or the like of the vehicle 10 is turned on, for example. In addition, for example, this process ends when operation to end the driving is performed, that is, when the ignition switch, the power switch, the start switch, or the like of the vehicle 10 is turned off, for example.

First, surrounding information of the vehicle 10 is detected by using the external sensor 25 (Step 101). The detected surrounding information is supplied to the matching process unit 31.

The DR process unit 30 calculates estimation values of a location and a posture (state quantities) of the vehicle 10 and degrees of confidence in the estimation values (Step 102). The DR process unit 30 acquires behavior information related to behavior of the vehicle 10 detected by the internal sensor 24, executes the dead reckoning process, and calculates estimation values indicating a current estimated location (current location) and a current estimated posture of the vehicle 10.

Note that, as described with reference to FIG. 7, the DR process unit 30 operates at an independent processing rate. Therefore, it can be said that Step 102 is a process of acquiring degrees of confidence and the estimation values calculated by the DR process unit 30 in response to completion of Step 101, for example. As described above, the DR process unit constantly estimates a location and a posture of the vehicle 10 that change over time. Accordingly, it is possible to execute a process that reflects a latest state of the vehicle 10 by using the degrees of confidence and the estimation values calculated by the DR process unit 30.

FIG. 10 is a schematic diagram illustrating an example of behavior of the vehicle 10. FIG. 10 schematically illustrates the vehicle 10 that is moving on a plane represented by the map coordinate system (X coordinates and Y coordinates). In addition, a state of the vehicle 10 in the map coordinate system is represented by a location (r=(x,y)) of the vehicle 10 and an orientation θ of the vehicle 10 on the XY plane. Here, θ is an angle between an x coordinate and a direction of movement of the vehicle 10.

It is assumed that the internal sensor 24 detects behavior information (such as acceleration) of the vehicle 10 at time t, for example. An amount and a direction of movement of the vehicle 10 from time t−1 to the time t is calculated from the behavior information. The time t−1 is one period of time before the time t. The state of the vehicle 10 at the time t is estimated on the basis of the amount of movement, the direction of movement, and the state (the estimation values of the location r and the orientation θ) of the vehicle 10 at the time t−1.

FIG. 10 schematically illustrates locations r1 to r5 of the vehicle 10 at time T1 to time T5. For example, the location r2 at the time T2 is an estimation value calculated on the basis of a movement amount and a movement direction from the time T1 to the time T2 while using the location r1 at the time T1 as a criterion. Note that, it is assumed that the location r and the orientation θ of the vehicle 10 in the map coordinate system has been acquired at the time T1.

In general, the behavior information detected by the internal sensor 24 includes errors. Therefore, in the case where only the dead reckoning process is repeated, the errors in the estimation values increase with each repetition of the step, and cumulative errors are accumulated.

FIG. 10 illustrates error ranges corresponding to the respective locations r1 to r5 by using elliptical errors 55. The elliptical error 55 represents a range where the vehicle 10 exists with any probability (such as a probability of 90% or the like), for example. As illustrated in FIG. 10, the size of the elliptical error 55 increases over time. The degrees of confidence in the estimation values decrease with the increase in the error. As a result, there is a possibility that the location indicated by the estimation value gradually deviates from an actual location of the vehicle 10.

For example, sometimes the estimation process using only the dead reckoning process may continue in an environment where accuracy of the GPS sensor is low or in an environment where it is impossible to use the GPS sensor (such as in a tunnel, a basement, a road between high-rise buildings, or an indoor area). In such a case, there is a possibility that the size of the elliptical error illustrated in FIG. 10 increases. Even in such a case, it is possible to reduce the errors in the estimation values and increase the degrees of confidence by performing a process of correcting (updating) the estimation values in Step 110 (to be described later).

Returning to FIG. 9, the matching process unit 31 sets a search range for searching for the reference information (Step 103). The matching process unit 31 searches for the reference information stored in the reference information database 26 on the basis of the estimation value (the current location of the vehicle 10) calculated in Step 102. The search range of the reference information of this time, that is, conditions or the like for searching for the reference information is set.

Figures 11A, 11B:
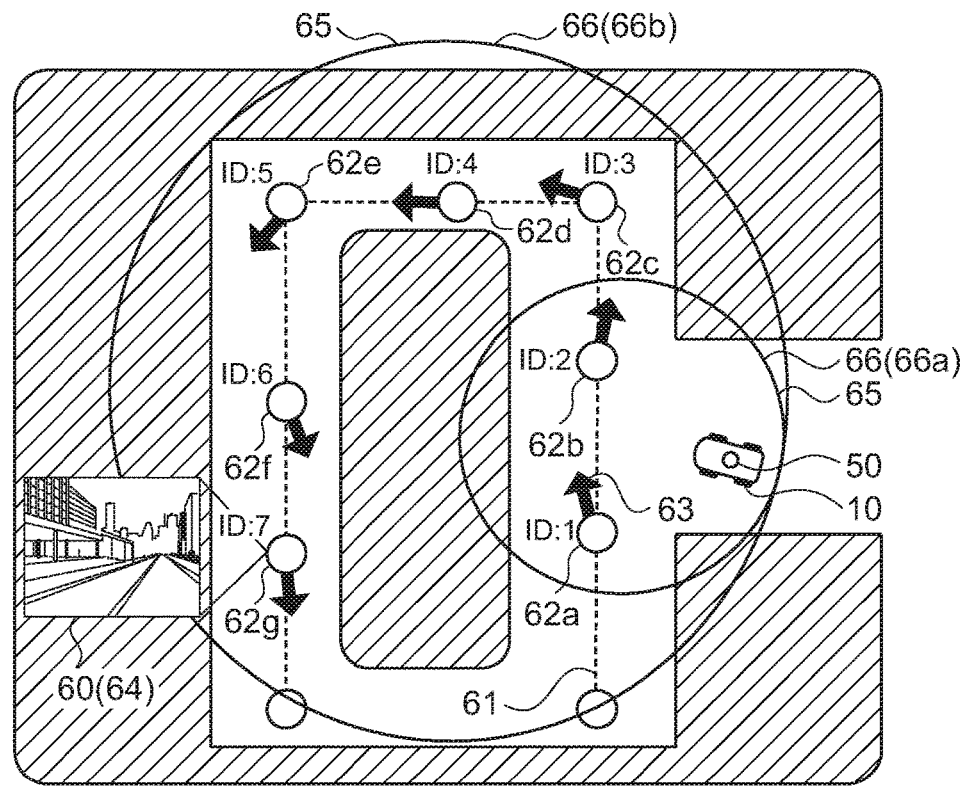
FIGS. 11A and 11B are schematic diagrams for describing examples of a search range of reference information.

FIGS. 11A and 11B are schematic diagrams for describing examples of the search range of reference information. FIG. 11A is a schematic diagram illustrating the examples of the search range of reference information 60. FIG. 11B is a table indicating a specific example of the reference information 60 illustrated in FIG. 11A.

FIG. 11A schematically illustrates an acquisition route 61 through which the map generation vehicle has passed and acquired the reference information 60 in the past, and acquisition locations 62a to 62g of pieces of the reference information 60. In addition, arrows schematically indicate acquisition directions 63 of the respective pieces of reference information 60. Note that, FIG. 11A illustrates image information (a keyframe 64) acquired in the acquisition location 62g, as an example. In addition, it is assumed that the vehicle 10 is moving near the acquisition locations 62a and 62b among the seven acquisition locations 62a to 62g.

As illustrated in FIG. 11B, an ID for identifying each piece of the reference information 60 is attached to each piece of the reference information 60. In addition, the pieces of reference information 60 are stored in such a manner that the keyframes (such as the image information and the depth information), coordinates (x,y) of the acquisition locations 62, and angles (θ) indicating the acquisition directions 63 are associated with each other. The matching process unit 31 searches for a piece of the reference information 60 by appropriately referring to the acquisition locations 62 and the acquisition directions 63, for example.

As illustrated in FIG. 11A, for example, a surrounding region 66 of the vehicle 10 is set as a search range 65 of the reference information 60, while using the current location (an estimation value) of the vehicle 10 as a criterion. FIG. 11A schematically illustrates circular surrounding regions 66. For example, the reference information 60 acquired in a surrounding region 66, that is, the reference information 60 whose acquisition location 62 is within the surrounding region 66 is searched out from the reference information database 26.

By setting the surrounding region 66 as described above, it is possible to search for the reference information 60 acquired in a desired region. Note that, the present technology is not limited to the case of using the surrounding region 66. For example, it is also possible to set a search range in such a manner that N number of pieces of reference information are acquired in the order of proximity of acquisition locations to the current location of the vehicle 10. Alternatively, the search range may be appropriately set in accordance with not only the location r of the vehicle 10 but also the orientation θ of the vehicle 10.

According to the present embodiment, the search range 65 of the reference information (the surrounding region 66) is set on the basis of the degrees of confidence. FIG. 11A illustrates a surrounding region 66a with a high degree of confidence and a surrounding region 66b with a low degree of confidence.

For example, in the case where a degree of confidence in the current location 50 of the vehicle 10 is high, the error in the current location 50 of the vehicle 10 is small (see FIG. 10). In other words, a location where the vehicle actually exists (a true current location) is considered to be close to a location designated by the estimation value. In this case, it is only necessary to acquire reference information within a range close to the estimation value, and it is not necessary to acquire reference information in a distant location. Therefore, the search range 65 (the surrounding region 66a) is set to a narrow range.

In the case where the degree of confidence in the current location of the vehicle 10 is high, the surrounding region 66a is set in such a manner that a region around the vehicle 10 serves as a search target as illustrated in FIG. 11A. The surrounding region 66a includes the acquisition locations 62a and 62b. Therefore, as illustrated in FIG. 11B, a search result 67a obtained in the case of the high degree of confidence includes the reference information 60a obtained in the acquisition location 62a and the reference information 60b obtained in the acquisition location 62b.

On the other hand, in the case where a degree of confidence in the current location 50 of the vehicle 10 is low, the error in the current location 50 of the vehicle 10 is large. In other words, there is a possibility that the true current location of the vehicle 10 is distant from the location designated by the estimation value. Therefore, in the case of searching for the reference information, not only the reference information within the range close to the estimation value, but also the reference information in the distant location are acquired. Therefore, the search range 65 (the surrounding region 66) is set to a wide range.

In the case where the degree of confidence in the current location of the vehicle 10 is low, the surrounding region 66b is set in such a manner that a region including locations close to and distant from the vehicle 10 serves as a search target as illustrated in FIG. 11A. The surrounding region 66b includes all the acquisition locations 62a to 62g in FIG. 11A. Therefore, as illustrated in FIG. 11B, a search result 67b obtained in the case of the low degree of confidence includes all the seven pieces of reference information 60a to 60g.

As described above, according to the present embodiment, the search range 65 is set to a narrower range as the degree of confidence becomes higher, and the search range 65 is set to a wider range as the degree of confidence becomes lower. As a result, the number of pieces of the reference information 60 searched out in the case of the high degree of confidence is smaller than the number of pieces of the reference information 60 searched out in the case of the low degree of confidence. In other words, the number of pieces of reference information included in a search result decreases as the degree of confidence gets higher.

Returning to FIG. 9, the frequency control unit 40 controls frequency of update of the global movement plan on the basis of the degree of confidence (Step 104). For example, the frequency control unit 40 sets frequency of update corresponding to the value of the degree of confidence calculated in Step 102, and controls behavior of the global movement planning unit 41 in such a manner that the global movement plan is updated with the set frequency of update.

FIG. 12 is a table indicating relationships between the frequencies of update of the global movement plan and CPU load factors at a stage of searching for the reference information. The stage (a search stage) of searching for the reference information is a stage before the matching process unit 31 decides the correction reference information from the reference information database 26, for example. Note that, Step 104 is a process that is executed at the stage of searching for the reference information.

For example, as illustrated in a left column of FIG. 12, the search range 65 of the reference information is set to a narrow range in the case of a high degree of confidence. As a result, the number of pieces of reference information included in a search result, that is, the number of pieces of reference information serving as a target of a matching process performed in Step 105 (to be described later) decreases. Therefore, it is considered that the self location estimation unit 132 executes the matching process with a low CPU load factor.

In the case of a high degree of confidence, the frequency control unit 40 sets the frequency of update of the global movement plan to high frequency. As a result, the CPU load factor necessary for the process of updating the global movement plan becomes high. This makes it possible to sufficiently utilize processing capacity of the CPU, for example. In addition, it is also possible to improve accuracy of update of the global movement plan by updating the global movement plan with the high degree of confidence.

In addition, as illustrated in a right column of FIG. 12, the search range 65 of the reference information is set to a wide range in the case of a low degree of confidence. As a result, the number of pieces of reference information serving as targets of the matching process increases, and it is considered that the self location estimation unit 132 executes the matching process with a high CPU load factor.

In the case of a low degree of confidence, the frequency control unit 40 sets the frequency of update of the global movement plan to low frequency. As a result, the CPU load factor necessary for the process of updating the global movement plan becomes low. Therefore, it is possible to sufficiently suppress increase in entire processing loads even in the case where the CPU load factor of the self location estimation unit 132 increases.

As described above, according to the present embodiment, the frequency of update is set to higher frequency as the degree of confidence becomes higher, and the frequency of update is set to lower frequency as the degree of confidence becomes lower. This makes it possible to balance a processing load of the process of estimating a location and a posture of the vehicle 10 and a processing load of the process of updating the global movement plan, for example, and this makes it possible to achieve sufficiently stable movement control.

In addition, by using the degrees of confidence, it is possible to control the frequency of update in accordance with an amount of increase in the CPU processing load or the like, for example. In other words, it can be said that the degree of confidence sufficiently functions as an index (load index information) indicating change in the processing load necessary for the estimation process.

FIG. 13 is a graph illustrating an example of a relationship between the degrees of confidence and the frequencies of update. A horizontal axis in the graph represents the degrees of confidence in an estimation value (self location), and the degrees of confidence are represented by values from 0% to 100%. A vertical axis in the graph represents the frequencies of update (replanning rate) of the global movement plan, and the frequencies of update are represented by values from 0 Hz to 1 Hz. Note that, frequency of update of 0 Hz means that the update is stopped.

As illustrated in FIG. 13, the frequencies of update are set in such a manner that the relationship between the degrees of confidence and the frequencies of update forms a linear shape. In other words, the frequency control unit 40 linearly changes the frequency of update in response to change in the degree of confidence. In the example illustrated in FIG. 13, the frequencies of update are represented by a line through the origin. For example, the frequency of update is set to 0 Hz (stop) in the case where the degree of confidence is 0%, and the frequency of update is set to 1 Hz in the case where the degree of confidence is 100%. As described above, it is possible to easily control the balance between processing loads by linearly controlling the frequencies of update with respect to the degrees of confidence.

Note that, a slope of the graph, an upper limit of the frequencies of update, and the like may be appropriately set. In addition, it is also possible to perform control by using a non-linear function or the like instead of the linear control over the frequencies of update. In addition, the method of controlling the frequencies of update on the basis of the degrees of confidence is not limited. For example, any method may be used as long as it is possible to balance the processing loads, for example.

Returning to FIG. 9, a process of matching the reference information and the surrounding information is executed (Step 105) when the control over the frequencies of update is completed. Specifically, the matching process unit 31 executes a process of matching the surrounding information acquired in Step 101 and the one or more pieces of reference information searched out in Step S103.

In the process of matching the surrounding information and the respective pieces of reference information, matching rates between the surrounding information and keyframes included in the respective pieces of reference information are calculated. For example, a piece of the reference information whose matching rate exceeds a predetermined threshold is treated as reference information similar to the surrounding information, and is decided as the correction reference information for correcting the estimation value. In this case, it is also possible to decide a plurality of pieces of correction reference information.

Note that, in the case where there is no reference information whose matching rate exceeds the predetermined threshold, no reference information similar to the surrounding information is searched out, and no correction reference information is decided.

A method of deciding the correction reference information through the matching process is not limited. For example, it is possible to execute a process of deciding a piece of reference information with the highest matching rate as the correction reference information among pieces of reference information whose matching rates exceed the predetermined threshold. In addition, it is also possible to decide the correction reference information on the basis of a condition (such as weather or time) other than the threshold.

When the matching process is completed, it is determined whether or not the correction reference information is decided (Step 106). In the case where it is determined that the correction reference information is not decided (No in Step 106), the processes in Step 101 to Step 105 are executed again. In other words, surrounding information is acquired again, and the process of searching for the reference information is executed. Therefore, it can be said that the estimation process performed by the self location estimation unit 132 before the correction reference information is found is the stage of searching for the reference information.

In the search stage, a self location of the vehicle 10 is identified (an estimation process is performed) only through the dead reckoning process performed by the internal sensor 24 such as the wheel encoders or the IMU sensor. If the time taken for the search stage gets longer, the degree of confidence in the estimation value gradually decreases. As a result, the search range of the reference information becomes wider, and the CPU load factor necessary for the matching process increases.

Even in such a case, it is possible to adjust CPU load factors of the whole system in a balanced manner, by appropriately controlling the frequency of update of the global movement plan (Step 104). This makes it possible to stably continue respective processes necessary to control movement of the vehicle 10.

In addition, for example, it is possible to sufficiently secure a computational resource (processing capacity of the CPU) necessary for the matching process, and it is possible to shorten the processing time of the matching process. As a result, it is possible to sufficiently avoid a situation where the matching process takes time, uncertainty of the location increases, and a next matching process takes more time.

In the case where it is determined that the correction reference information is decided (Yes in Step 106), the place recognition process unit 32 executes the place recognition process (Step 107). For example, respective absolute values of the current location and posture of the vehicle 10 are calculated from a result (matching information) of matching the correction reference information and the surrounding information, with respect to the acquisition location and the acquisition direction of the correction reference information. This makes it possible to recognize the location and the posture of the vehicle 10 in the global map.

The correction process unit 33 determines whether or not to execute the correction process by using the loop closing function on the basis of a predetermined determination condition (Step 108). On the basis of the predetermined determination condition, it is possible to determine various kinds of situations such as whether or not the correction process is necessary, and whether or not it is possible to execute the correction process, for example.

For example, it is determined whether the correction process is executed within a predetermined period of time. In this case, the predetermined period of time is used as the determination condition. For example, in the case where the correction process is executed within the predetermined period of time, it is determined that the estimation value has already been corrected sufficiently, and the correction process is not necessary (it is determined not to execute the correction process). Conversely, in the case where the correction process is not executed within the predetermined period of time, it is determined that there is a possibility that the error in the estimation value has increased, and the correction process is necessary (it is determined to execute the correction process). In addition, a method or the like of setting the predetermined determination condition is not limited. It is possible to use any condition for determining whether or not to execute the correction process.

In the case where it is determined not to execute the correction process (No in Step 108), the process returns to Step 101 and processes for searching for next correction reference information (Step 101 to Step 107) are executed. In addition, information indicating that the correction process is not to be executed is output to the frequency control unit 40 as determination information. In this case, the global movement planning unit 41 continues updating the global movement plan with frequency of update set at this time.

In the case where it is determined to execute the correction process (Yes in Step 108), information indicating that the correction process is to be executed is output to the frequency control unit 40 as determination information. In this case, the global movement plan is stopped (Step 109). As described above, the frequency control unit 40 stops the global movement planning unit 41 from updating the global movement plan on the basis of the determination information. For example, a process of temporarily setting the frequency of update of the global movement plan to 0 Hz is executed at the timing of acquiring the determination information indicating that the correction process is to be executed (see FIG. 13).

Note that, even in the case where provision of the global movement plan is stopped, update of the local movement plan (the course plan such as speed and rotation of wheels) continues. For example, the local movement planning unit 42 generates a course plan for safely moving the vehicle 10 on the basis of a snapshot (such as image information and depth information) of the current time acquired by the external sensor 25 or the like. This makes it possible to continue the safe movement control while the global movement plan is stopped.

The correction process unit 33 executes a process of correcting the estimation value by using the loop closing function (Step 110). FIG. 14 is a schematic diagram illustrating an example of the correction process using the loop closing function.

For example, information related to past passage locations of the vehicle 10 and postures at the passage locations stored in the storage unit 111, that is, information regarding trajectories through which the vehicle has traveled in the past is acquired. Such information is estimation values estimated through the dead reckoning process, for example. According to the loop closing function, the past passage locations of the vehicle 10 and the postures at the respective passage locations are corrected while using the absolute values of the location and the posture calculated in Step 107 as criteria.

FIG. 14 schematically illustrates past locations R1 to R3 of the vehicle 10 and corrected locations R1' to R3' of the vehicle 10. Note that, a location R4 is a location where the correction process has been performed in the past by using the loop closing function. As illustrated in FIG. 14, it is possible to correct the locations through which the vehicle has traveled in the past and the postures at the respective locations, by performing the correction process.

This makes it possible to sufficiently reduce the error or the like occurred in the dead reckoning process. In addition, it is also possible to create a map with very high accuracy (a local map such as the self location estimation map) by performing the correction process including correction of the trajectories though which the vehicle has traveled in the past. The loop closing function is achieved by using a technology such as GraphSLAM, for example.

FIG. 15 is a table indicating a relationship between the frequency of update of the global movement plan and CPU load factors at a stage of executing an estimation value correction process. In the case of executing the estimation value correction process, it is considered that a degree of confidence in the estimation value is low, that is, the correction process is necessary. Note that, sometimes the loop closing function may be executed even in the case where the degree of confidence in the estimation value is high.

As illustrated in FIG. 15, sometimes a CPU load factor temporarily increases in an estimation value correction stage, that is, in a stage of correcting a past trajectory thorough which the vehicle 10 has passed. However, in the estimation value correction stage, update of the global movement plan is temporarily stopped, and a CPU load factor necessary to update the global movement plan is zero.

As described above, in the case of executing the correction process, it is possible to prepare sufficient computation capacity of the CPU by stopping update of the global movement plan. This makes it possible to sufficiently avoid malfunction (such as delay or freeze in each process) caused by increase in an amount of throughput, for example. As a result, it is possible to drastically stabilize the mobile object movement control. This makes it possible to safely control movement with high accuracy.

Returning to FIG. 9, when the correction process is completed, the update of the global movement plan is restarted (Step 111). For example, the frequency control unit 40 sets the frequency of update on the basis of the degree of confidence in the corrected estimation value, and restarts the update of the global movement plan. This makes it possible to improve accuracy of the update of the global movement plan.

When Step 111 is completed, the process returns to Step 101 and the above-described processes are repeated.

As described above, the self location estimation unit 132 alternately executes the process (the search stage) of searching for the correction reference information and the correction process (the correction stage) using the correction reference information. In addition, the frequency of update of the global movement plan is controlled in accordance with CPU load factors in respective stages of the estimation process performed by the self location estimation unit 132. As a result, it is possible to appropriately maintain processing loads of the whole system during the movement control, and it is possible to control the movement with sufficient stability.

As described above, the autonomous driving control unit 112 according to the present embodiment controls frequency of update of movement plans of the vehicle 10 on the basis of load index information serving as an index of a processing load of the estimation process of estimating at least one of a location or a posture of the vehicle 10. This makes it possible to control a processing load necessary for movement control and stably control the movement.

As the method of controlling movement of the vehicle, a method of replanning a route in accordance with change in the surrounding environment of the vehicle is considered. For example, the location and the posture of the vehicle is appropriately controlled in accordance with change in locations of other vehicles, pedestrians, and the like. A new route is replanned in the case where the location or the posture of the vehicle changes in this procedure. According to this method, various kinds of processes such as a process of detecting and recognizing the other vehicles and the like, and a process of replanning the route are executed in addition to the process of estimating the self location of the vehicle. Therefore, there is a possibility that a load on the CPU increases and malfunction such as delay or freeze in a process occurs.

According to the present embodiment, the frequency of update of the global movement plan is controlled on the basis of the load index information serving as an index of a processing load necessary for the estimation process performed by the self location estimation unit 132. This makes it possible to appropriately control processing loads on the whole system in accordance with the processing load necessary for the estimation process. As a result, it is possible to sufficiently suppress effects (such as delay or freeze) of increase in the processing load of the estimation process on other processes.

For example, the estimation process is roughly classified into respective stages including the stage of searching for the reference information in the case where a degree of confidence in the estimation value is high, the stage of searching for the reference information in the case where a degree of confidence in the estimation value is low, and the correction stage of correcting the estimation value, in ascending order of CPU load factors (see FIG. 12 and FIG. 15). Overall processing loads are adjusted by changing the frequency of update of the global movement plan with respect to the CPU loads factors in the respective stages.

In the search stages, the frequency of update is controlled while using the degree of confidence as an index. By using the degrees of confidence, it is possible to easily set the frequency of update in conformity with a processing load necessary for the matching process or the like, for example. In addition, it is possible to suppress power consumption because the global movement plan is not updated redundantly at a certain rate. Therefore, it is possible to increase life of the battery or the like.

In addition, in the correction stage, the update is stopped while using trigger information as an index. This makes it possible to assure processing capacity of the CPU in advance before the CPU load factor enlarges due to the loop closing function or the like. As a result, it is possible to sufficiently avoid malfunction such as freeze, and it is possible to achieve safe and reliable autonomous movement control.

As described above, according to the present technology, it is possible to stably continue estimation of the self location of the vehicle 10 even in the environment where it is impossible to use the GPS sensor or the like (such as in a tunnel or an indoor area). As a result, it is possible to achieve the autonomous movement control in such a manner that the vehicle 10 travels safely in various environments.

Other Embodiments

The present technology is not limited to the above-described embodiment. Various other embodiments are possible.

In the above-described embodiment, the reference information database is constructed by using the map generation vehicles. The present technology is not limited thereto. It is also possible for the vehicle to acquire the reference information by itself and construct the reference information database. For example, a keyframe (such as image information and depth information) acquired by using the external sensor installed in the vehicle, and a location and a posture of the vehicle obtained at the time of acquiring the keyframe are stored in the reference information database as the reference information.

In this case, estimation values of the current location and posture of the vehicle are corrected on the basis of the reference information that has been acquired by the vehicle itself in the past. Accordingly, keyframes acquired by using the same sensor (the external sensor) are compared with each other, and this makes it possible to accurately correct the estimation values. Note that, even in the case where the reference information database is constructed by the vehicle itself, it is possible to stably control movement by appropriately controlling the frequency of update of the global movement plan.

In the flowchart illustrated in FIG. 9, a process of adjusting the frequency of update of the global movement plan is executed before the matching process starts. However, the timing or the like of adjusting the frequency of update is mot limited. For example, the estimation values and the degrees of confidence are calculated through the dead reckoning process while the matching process is being executed. It is also possible to adjust the frequency of update of the global movement plan on the basis of the degrees of confidence while the matching process is being executed. This makes it possible to set the frequency of update in detail, and this makes it possible to adjust the CPU load factor or the like with high accuracy.

In addition, in the above-described embodiment, the process of determining whether or not to execute the correction process is executed (Step S108 in FIG. 9). The present technology is not limited thereto. For example, the process of determining whether to execute the correction process may not be performed. In this case, for example, update of the global movement plan is stopped at a timing of deciding the correction reference information. Next, after the correction process is executed, the update of the global movement plan is restarted. For example, the above-described process may be executed.

In the above-described embodiment, the frequency control unit controls the frequency of update of the global movement plan on the basis of the load index information. The present technology is not limited thereto. It is also possible to control frequency of update of the local movement plan. In addition, it is possible to execute a process of controlling respective frequencies of update of the global movement plan and the local movement plan. As described above, it is possible to appropriately maintain the processing loads on the whole system by appropriately controlling the frequencies of update of the respective movement plans.

In addition, it may be possible to notify of a situation of the update process such as information indicating that the global movement plan "is being updated" or information indicating that the global movement plan "has already been updated". For example, a predetermined notification image (such as an icon) indicating a situation of the update process is generated, and the predetermined notification image is appropriately displayed on a display or the like included in the output unit 106 illustrated in FIG. 2. This makes it possible for passengers to easily check whether the global movement plan has been updated, for example.

In the above-described embodiment, the autonomous driving control unit executes the information processing method according to the present technology, the information processing method including control over the frequency of update of the movement plans or the like. The present technology is not limited thereto. It is also possible for a cloud server to execute the information processing method according to the present technology. In other words, the functions of the autonomous driving control unit may be installed in the cloud server. In this case, the cloud server operates as the information processing apparatus according to the present technology.

In addition, when a computer (the autonomous driving control unit) installed in the vehicle and another computer (the could server) capable of communication via the network or the like work in conjunction with each other, the information processing method and the program according to the present technology are executed, and this makes it possible to configure the information processing apparatus according to the present technology.

In other words, the information processing method and the program according to the present technology may be executed not only in a computer system configured by a single computer but also in a computer system in which a plurality of computers operates in conjunction with each other. It should be noted that, in the present disclosure, the system means an aggregate of a plurality of components (such as apparatuses or modules (parts)) and it does not matter whether or not all the components are housed in the same casing. Therefore, a plurality of apparatuses housed in separate casings and connected to one another via a network, and a single apparatus having a plurality of modules housed in a single casing are both the system.

The execution of the information processing method and the program according to the present technology by the computer system includes, for example, both of the case where the estimation of at least one of the location or the posture of the vehicle, the generation of the movement plans for moving the vehicle, the control over the frequency of update of the movement plans, and the like are executed by a single computer and the case where those processes are executed by different computers. Further, the execution of the respective processes by a predetermined computer includes causing another computer to execute some or all of those processes and acquiring results thereof.

In other words, the information processing method and the program according to the present technology are also applicable to a cloud computing configuration in which one function is shared and cooperatively processed by a plurality of apparatuses via a network.

In the above-described embodiments, the description has been given while using the vehicle as an example of the mobile object. However, the present technology is applicable to any type of mobile object and the like. For example, an autonomous mobile robot or the like is considered as the mobile object. As a movement environment of the autonomous mobile robot, various environments such as an outdoor area like a road or a park, an indoor area like a hospital or a shopping mall, and a room area like an office or a living room are assumed. The autonomous mobile robot executes the self location estimation process, the movement plan generation process, and the like with regard to an environment where the robot itself moves, and moves to a destination.

For example, it is possible to appropriately control the processing loads of the whole system by controlling the frequency of update of the movement plan on the basis of information serving as an index of a processing load necessary for a process of estimating the self location of the autonomous mobile robot. This makes it possible to avoid freeze-up of the autonomous mobile robot or the like, and stably control movement. In addition, it is also possible to suppress power consumption of the CPU or the like, and it is possible to increase operating time of the autonomous mobile robot.

In addition, the technology according to the present disclosure can be applied to various products. For example, the technology according to the present disclosure may be realized as an apparatus installed in any kind of mobile object such as vehicles, electric vehicles, hybrid electric vehicles, motorcycles, bicycles, personal transporters, airplanes, drones, ships, robots, heavy equipment, agricultural machinery (tractors), and the like, for example.

Out of the feature parts according to the present technology described above, at least two feature parts can be combined. That is, the various feature parts described in the respective embodiments may be arbitrarily combined irrespective of the embodiments. Further, various effects described above are merely examples and are not limited, and other effects may be exerted.

Out of the feature parts according to the embodiments described above, at least two feature parts can be combined.

Note that, the present technology may also be configured as below.

(1) An information processing apparatus including:
an estimation unit that estimates at least one of a location or a posture of a mobile object;
a generation unit that generates a movement plan for moving the mobile object; and
a frequency control unit that controls frequency of update of the movement plan to be performed by the generation unit, on the basis of load index information serving as an index of a load on the estimation unit.

(2) The information processing apparatus according to (1), in which
the load index information includes a degree of confidence in an estimation result of the estimation made by the estimation unit, and
the frequency control unit controls the frequency of update of the movement plan on the basis of the degree of confidence.

(3) The information processing apparatus according to (2), in which
the frequency control unit sets the frequency of update to be higher as the degree of confidence becomes higher, and sets the frequency of update to be lower as the degree of confidence becomes lower.

(4) The information processing apparatus according to (2) or (3), in which
the frequency control unit linearly changes the frequency of update in response to change in the degree of confidence.

(5) The information processing apparatus according to any one of (2) to (4), in which the generation unit generates a global movement plan of the mobile object and a local movement plan of the mobile object, and the frequency control unit controls the frequency of update of the global movement plan on the basis of the degree of confidence.

(6) The information processing apparatus according to (5), in which the global movement plan includes a route plan of the mobile object to a destination.

(7) The information processing apparatus according to (5) or (6), in which the local movement plan includes a course plan indicating a movement direction of the mobile object from a current location.

(8) The information processing apparatus according to any one of (2) to (7), in which the mobile object includes a behavior sensor that detects behavior information related to behavior of the mobile object, and the estimation unit executes an estimation process through autonomous navigation on the basis of the behavior information detected by the behavior sensor, and calculates the degree of confidence in the estimation result.

(9) The information processing apparatus according to any one of (2) to (8), in which the mobile object includes a surrounding sensor that detects surrounding information related to an ambient environment around the mobile object, and the estimation unit decides correction reference information for correcting the estimation result by searching for one or more pieces of reference information related to the ambient environment around the mobile object on the basis of the estimation result, and executing a matching process of the one or more pieces of searched-out reference information and the surrounding information detected by the surrounding sensor.

(10) The information processing apparatus according to (9), in which the estimation unit sets a search range of the reference information on the basis of the degree of confidence.

(11) The information processing apparatus according to (10), in which the estimation unit sets the search range to a narrower range as the degree of confidence becomes higher, and sets the search range to a wider range as the degree of confidence becomes lower.

(12) The information processing apparatus according to any one of (9) to (11), in which the load index information includes execution information indicating whether or not to execute a correction process of the estimation result on the basis of the correction reference information.

(13) The information processing apparatus according to (12), in which the correction process is a process of correcting a current estimation result and a past estimation result of the mobile object.

(14) The information processing apparatus according to (12) or (13), in which the frequency control unit stops the generation unit from updating the movement plan on the basis of the execution information.

(15) The information processing apparatus according to (12) or (13), in which the generation unit generates a global movement plan of the mobile object and a local movement plan of the mobile object, and the frequency control unit stops the generation unit from updating the global movement plan on the basis of the execution information.

(16) The information processing apparatus according to any one of (12) to (15), in which the estimation unit determines whether or not to execute the correction process, and executes the correction process in response to a determination result.

(17) The information processing apparatus according to (16), in which in the case where it is determined to execute the correction process, the estimation unit outputs information to the frequency control unit as the execution information, the information indicating that the correction process is to be executed.

REFERENCE SIGNS LIST 10 vehicle
24 internal sensor
25 external sensor
26 reference information database
30 DR process unit
31 matching process unit
32 place recognition process unit
33 correction process unit
40 frequency control unit
41 global movement planning unit
42 local movement planning unit
52 planned route
54 course
60, 60a to 60g reference information
65 search range
102 data acquisition unit
112 autonomous driving control unit
132 self location estimation unit
134 planning unit

The invention claimed is:

1. An information processing apparatus, comprising:
a memory configured to store an estimation result and a movement plan; and
a central processing unit (CPU) configured to:
generate, by an estimation process, the estimation result based on information from a plurality of sensors, wherein the estimation result comprises at least one of a location or a posture of a mobile object;
generate the movement plan for the mobile object;
control a frequency of an update of the movement plan, based on load index information which indicates a change in a processing load of the CPU for the estimation process; and
control a movement of the mobile object based on the generated movement plan.

2. The information processing apparatus according to claim 1, wherein
the load index information includes a degree of confidence in the estimation result, and
the CPU is further configured to control the frequency of the update of the movement plan based on the degree of confidence.

3. The information processing apparatus according to claim 2, wherein the CPU is further configured to:

increase the frequency of the update of the movement plan based on an increase in the degree of confidence, and decrease the frequency of the update of the movement plan based on a decrease in the degree of confidence.

4. The information processing apparatus according to claim 2, wherein the CPU is further configured to linearly change the frequency of the update based on a change in the degree of confidence.

5. The information processing apparatus according to claim 2, wherein the CPU is further configured to:
generate a global movement plan of the mobile object and a local movement plan of the mobile object, and
control a frequency of an update of the global movement plan based on the degree of confidence.

6. The information processing apparatus according to claim 5, wherein the global movement plan includes a route plan of the mobile object to a destination.

7. The information processing apparatus according to claim 5, wherein the local movement plan includes a course plan to indicate a movement direction of the mobile object from a current location.

8. The information processing apparatus according to claim 2, wherein
the mobile object includes a behavior sensor that detects behavior information related to behavior of the mobile object,
the plurality of sensors includes the behavior sensor, and
the CPU is further configured to:
execute the estimation process by an autonomous navigation based on the behavior information detected by the behavior sensor; and
calculate the degree of confidence in the estimation result.

9. The information processing apparatus according to claim 2, wherein
the mobile object includes a surrounding sensor that detects surrounding information related to an ambient environment around the mobile object,
the plurality of sensors includes the surrounding sensor, and
the CPU is further configured to:
determine correction reference information for correcting the estimation result by searching for at least one piece of reference information related to the ambient environment around the mobile object, and
execute a matching process of the at least one piece of the reference information and the surrounding information detected by the surrounding sensor.

10. The information processing apparatus according to claim 9, wherein the CPU is further configured to set a search range of the reference information based on the degree of confidence.

11. The information processing apparatus according to claim 10, wherein the CPU is further configured to:
decrease the search range based on an increase in the degree of confidence, and
increase the search range based on a decrease in the degree of confidence.

12. The information processing apparatus according to claim 9, wherein the load index information includes execution information indicating whether to execute a correction process of the estimation result based on the correction reference information.

13. The information processing apparatus according to claim 12, wherein the correction process is correction of a first estimation result and a second estimation result of the mobile object.

14. The information processing apparatus according to claim 12, wherein the CPU is further configured to stop the update of the movement plan based on the execution information.

15. The information processing apparatus according to claim 12, wherein the CPU is further configured to:
generate a global movement plan of the mobile object and a local movement plan of the mobile object; and
stop an update of the global movement plan based on the execution information.

16. The information processing apparatus according to claim 12, wherein the CPU is further configured to:
determine whether to execute the correction process; and
execute the correction process in response to the determination of the execution of the correction process.

17. The information processing apparatus according to claim 16, wherein in a case the execution of the correction process is determined, the CPU is further configured to output the execution information indicating that the correction process is executed.

18. An information processing method, comprising:
generating, by a central processing unit (CPU) by an estimation process, an estimation result based on information from a plurality of sensors, wherein the estimation result comprises at least one of a location or a posture of a mobile object;
generating, by the CPU, a movement plan for the mobile object;
controlling, by the CPU, a frequency of update of the movement plan, based on load index information which indicates a change in a processing load of the CPU for the estimation process; and
controlling, by the CPU, a movement of the mobile object based on the generated movement plan.

19. A non-transitory computer-readable medium having stored thereon, computer-executable instructions which, when executed by a computer, cause the computer to execute operations, the operations comprising:
generating, by an estimation process, an estimation result based on information from a plurality of sensors, wherein the estimation result comprises at least one of a location or a posture of a mobile object;
generating a movement plan for the mobile object;
controlling a frequency of update of the movement plan, based on load index information which indicates a change in a processing of the computer for the estimation process; and
controlling a movement of the mobile object based on the generated movement plan.

20. A mobile object, comprising:
a memory configured to store an estimation result and a movement plan; and
a central processing unit (CPU) configured to:
generate, by an estimation process, the estimation result based on information from a plurality of sensors, wherein the estimation result comprises at least one of a location or a posture of the mobile object;
generate the movement plan for the mobile object;
control a frequency of update of the movement plan, based on load index information which indicates a change in a processing load of the CPU for the estimation process; and control a movement of the mobile object based on the generated movement plan.

\* \* \* \* \*